United States Patent
Tatekawa et al.

(10) Patent No.: US 7,472,403 B2
(45) Date of Patent: Dec. 30, 2008

(54) DISK-STORING DISK DEVICE HAVING A DRIVE UNIT AND A TRANSPORTING-UNIT SUPPORTED ABOUT FULCRUM

(75) Inventors: Tsutomu Tatekawa, Iwaki (JP); Shoji Suzuki, Iwaki (JP); Tokio Suzuki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 478 days.

(21) Appl. No.: 11/385,258

(22) Filed: Mar. 21, 2006

(65) Prior Publication Data

US 2006/0215502 A1 Sep. 28, 2006

(30) Foreign Application Priority Data

Mar. 25, 2005 (JP) ............... 2005-088160

(51) Int. Cl.
*G11B 17/04* (2006.01)
(52) U.S. Cl. ..................................... 720/624
(58) Field of Classification Search ............... 720/624; 369/30.77
See application file for complete search history.

(56) References Cited

U.S. PATENT DOCUMENTS

| 6,370,105 | B1 | 4/2002 | Fujimoto |
| 6,396,796 | B1 | 5/2002 | Kletzl |
| 6,772,426 | B2* | 8/2004 | Akatani ............... 720/624 |
| 6,832,382 | B2 | 12/2004 | Ito et al. |
| 6,947,357 | B2 | 9/2005 | Otsuki |
| 7,103,894 | B2* | 9/2006 | Inatani et al. ............... 720/625 |
| 2003/0090984 | A1* | 5/2003 | Lee et al. ............... 369/77.1 |

FOREIGN PATENT DOCUMENTS

| EP | 1 246 180 | 10/2002 |
| JP | 11-144438 | 5/1999 |
| JP | 2003-101745 | 4/2001 |
| JP | 2003-141809 | 5/2003 |
| JP | 2003-217223 | 7/2003 |

* cited by examiner

*Primary Examiner*—David D Davis
(74) *Attorney, Agent, or Firm*—Brinks Hofer Gilson & Lione

(57) ABSTRACT

In a disk-storing disk device according to the present invention, within a casing having an insertion opening formed on the front face for inserting a disk, a plurality of holders are arranged in piles disproportionately on the X1 side about an insertion center line while a drive unit is rotatably supported on the X2 side from the insertion center line. When any of the holders is selected and a disk is inserted through the insertion opening, the disk is clamped to transfer rollers. A transporting unit is counterclockwise rotated while the disk is transferred with the transfer rollers. By the rotation, the disk is securely conveyed to the holder arranged disproportionately on the X1 side. Thereby, efficiency of arranging respective units in the casing is improved so as to provide a disk-storing disk device with short depth size.

22 Claims, 15 Drawing Sheets

DISK-STORING DISK DEVICE HAVING A DRIVE UNIT AND A TRANSPORTING-UNIT SUPPORTED ABOUT FULCRUM

CROSS-REFERENCE TO RELATED APPLICATION

This application is related to co-pending non-provisional application Ser. No. 11/386,079, filed on Mar. 21, 2006, entitled DISK DEVICE.

BACKGROUND OF THE INVENTION

1. Field of the Invention

The present invention relates to a disk-storing disk device in that one disk is selected from a plurality of disks stored in a casing for driving it.

2. Description of the Related Art

An in-dash type on-vehicle disk-storing disk device includes a case complying with 1 DIN or 2 DIN standards in size, and a disk is inserted into the case one by one so as to store a plurality of disks in the case. Disk selecting means is provided in the case, and a space between the selected disk and a disk adjacent thereto is increased by the disk selecting means so that a drive unit moves into the space so as to clamp the selected disk for driving it.

In disk devices disclosed in Japanese Unexamined Patent Application Publication No. 2003-217223 and that No. 2003-141809, in the case, trays (holders), each for holding a disk, are provided in piles and selecting means is arranged for increasing a space between the selected disk and a disk adjacent thereto. An insertion opening is opened on the front surface of the case for inserting the disk therethrough one by one. Between the front surface and a tray installation region, a withdrawn region of a drive unit is provided. Within the case on one lateral side, transferring means having a number of rollers is provided. On the other side, a guide member is provided.

The disk inserted through the insertion opening, with the outer edge of the disk being clamped between the transferring means and the guide member, is conveyed into the case by the rotation of a plurality of the rollers.

When a disk is driven, the drive unit located at the withdrawn position is moved to between the disk held in the selected tray and a disk adjacent thereto, so that the disk held in the selected tray is clamped between the drive unit and a turntable so as to be rotated.

However, in the conventional disk device described above, since the withdrawn position of the drive unit is located between the front surface of the case and the tray installation region, there is limitation in reducing the depth size of the case, preventing miniaturization.

In such a disk-storing disk device, as mentioned above, on one lateral side in the case, transferring means having a number of rollers is provided and on the other side, a guide member is provided, and the disk inserted through the insertion opening, with the outer edge of the disk being clamped between the transferring means and the guide member, is conveyed into the case by the rotation of a plurality of the rollers. Instead of this mechanism, between the front surface of the case and the tray installation region, a transfer roller rotating about an axis extending in the lateral direction of the case may be provided while a clamping member opposing the transfer roller from above or below may be arranged, so that a disk may be conveyed by rotating the transfer roller in a state that the disk is clamped on both sides of the disk between the transfer roller and the clamping member.

However, in this case, the disk inserted through the insertion opening is clamped between the transfer roller and the clamping member so as to convey the disk toward the inside of the case for transferring the disk to the tray. Thereafter, it is required to separate the transfer roller and the clamping member from the outer edge of the disk held by the holder by moving them to the front side of the case. However, since the transfer roller and the clamping member are moved in a direction perpendicular to the axial direction of the transfer roller, a large movement region is necessary therefor, so that miniaturizing the case becomes more difficult.

SUMMARY OF THE INVENTION

Accordingly, the present invention has been made for solving the conventional problems described above, and it is an object thereof to provide a disk-storing disk device capable of setting a small depth size of a casing as well as being capable of securely conveying a disk inserted through an insertion opening toward a holder.

A disk-storing disk device according to the present invention includes a casing having an insertion opening formed on the front face of the casing; a drive unit having a rotation drive unit arranged within the casing operable to rotate a disk;

a transporting unit arranged within the casing having a transfer roller and a clamp member operable to clamp a disk therebetween; a plurality of disk holders arranged within the casing so as to overlap with each other in one direction; and a holder selector arranged within the casing operable to move any of the disk holders to a selected position as well as for increasing a space between a first disk holder located at the selected position and a second disk holder adjacent thereto, wherein when a phantom line dividing the insertion opening into two in the opening width direction and extending in a direction perpendicular to the front face of the casing is defined as an insertion center line, the center of the disk held by the first disk holder is separated from the insertion center line on a first side while the drive unit is separated from the insertion center line on a second side, which is opposite of the first side, and the drive unit is rotatably supported about a first fulcrum positioned near the back side of the casing while the transporting unit is positioned inside the front face of the casing and rotatably supported about a second fulcrum positioned on the first side and separated from the insertion center line, the disk-storing disk device further includes rotating unit operable to rotate the drive unit from an withdrawn position, in which the rotation drive unit is positioned on the front side of the casing as well as separated from the outer periphery of the disk held by a disk holder, to an overlapping position, in which the rotation drive unit overlaps with the disk when held by the disk holder; and a transporting-unit rotating unit operable to rotate the transporting unit from a standby position, in which the shaft of the transfer roller is parallel with the front face of the casing as well as separated from the outer periphery of the disk when held by the disk holder, to a transfer operation position, in which the transfer roller overlaps with the disk when held by the disk holder, wherein when a disk inserted through the insertion opening is clamped between the transfer roller and the clamp member, the transporting unit is rotated to the transfer operation position so as to convey the disk toward the holder located at the selected position.

In the disk-storing disk device according to the present invention, the holder is positioned on the first side in the casing, and the second side is the withdrawn position of the drive unit while the front inner side of the casing is the standby position of the transporting unit. By such arrangement, the depth size of the casing can be reduced so that the depth size of the casing may be reduced smaller than 1 DIN size, for example.

The transporting unit is rotated inside the casing about the first fulcrum positioned on the first side, so that the arrangement region of the holders is arranged disproportionately on the first side. Therefore, the disk clamped between the transfer roller and the clamp member is conveyed while approaching the holder along with the rotation of the transporting unit, so that the disk can be securely transferred to the holder.

According to the present invention, preferably, the rotating region of the drive unit overlaps with that of the transporting unit, and when the drive unit is located at the overlapping position, the transporting unit is rotated from the standby position to the transfer operation position.

According to the present invention, preferably, when the holder is moved to the selected position by the holder selecting means, in a state that the transporting unit is returned to the standby position, the drive unit is rotated from the overlapping position to the withdrawn position.

In such a manner, when the rotating regions of the drive unit and the transporting unit are configured so as to overlap with each other, the drive unit can be located at a position close to the front face of the casing, further reducing the depth size of the casing.

According to the present invention, preferably, when the transporting unit is rotated from the standby position toward the transfer operation position, the transfer roller is rotated in a rotation direction conveying the disk toward the holder, and after conveying the disk to a position capable of holding the disk with the holder, the transporting unit is returned to the standby position from the transfer operation position while the transfer roller is rotated in the conveying rotation direction.

In this case, preferably, when the transporting unit is returned to the standby position from the transfer operation position, the revolution speed of the transfer roller is established so as to pressurize the disk to the holder.

In the structure described above, when the transporting unit is rotated to the standby position from the transfer operation position, the slippage between the disk and the transfer roller or the force for carrying out the disk toward the insertion opening can be suppressed. Furthermore, the disk can be securely held to the holder by pressing the disk to the holder with the rotating power of the transfer roller.

In this case, preferably, when the disk held with the holder located at the selected position is moved out of the case via the insertion opening, or when the disk released from the clamping in the rotation drive unit is carried out from the insertion opening, the transporting unit is returned to the standby position from the transfer operation position while the transfer roller is rotated in a moving or carrying out rotation direction which is reverse to the conveying rotation direction.

In order to select the rotating direction of the transfer roller as described above, the roller driving means for rotating the transfer roller may be arranged differently from the transporting unit rotating means.

According to the present invention, preferably, an intermediate portion of the transfer roller in the axial direction is deleted so that the intermediate portion is smaller in diameter than both-side portions, and when the transporting unit is moved to the transfer operation position, the intermediate portion does not clamp the disk.

By providing the intermediate portion as described above, when the transporting unit is located at the transfer operation position, the contact length between the transfer roller and the disk is short. Hence, when the transporting unit is rotated to the standby position, the transfer roller is directly separated from the disk. Also, since the disk can be clamped between the transfer roller and the clamp member at the time when the disk is inserted into the insertion opening to some extent, the disk can be securely conveyed into the casing, improving operability during inserting the disk.

According to the present invention, preferably, between a free-end portion of the drive unit located at the withdrawn position, which is the reverse side to the first fulcrum, and a free-end portion of the transporting unit located at the standby position, which is the reverse side to the second fulcrum, a retainer is provided for retaining the drive unit and the transporting unit together.

In the above structure, when the disk device is under transportation and storage conditions, by retaining the drive unit to the transporting unit, the drive unit and the transporting unit can be prevented from rattling.

According to the present invention, by efficiently arranging respective units within the casing, the depth size of the casing can be reduced. Also, to the holders positioned disproportionately on the first side about the insertion center line of the disk, the disk inserted through the insertion opening can be securely conveyed.

BRIEF DESCRIPTION OF THE DRAWINGS

FIGS. 8A and 8B show the support base of the drive unit in a restricted state and a restriction-released state, wherein FIG. 8A is a side view viewed in arrow VIII direction of FIG. 6 showing the restricted state of the support base of the drive unit and FIG. 8B is a side view viewed in arrow VIII direction of FIG. 7 showing the restriction-released state of the support base of the drive unit;

DESCRIPTION OF THE PREFERRED EMBODIMENTS

Figure 1:
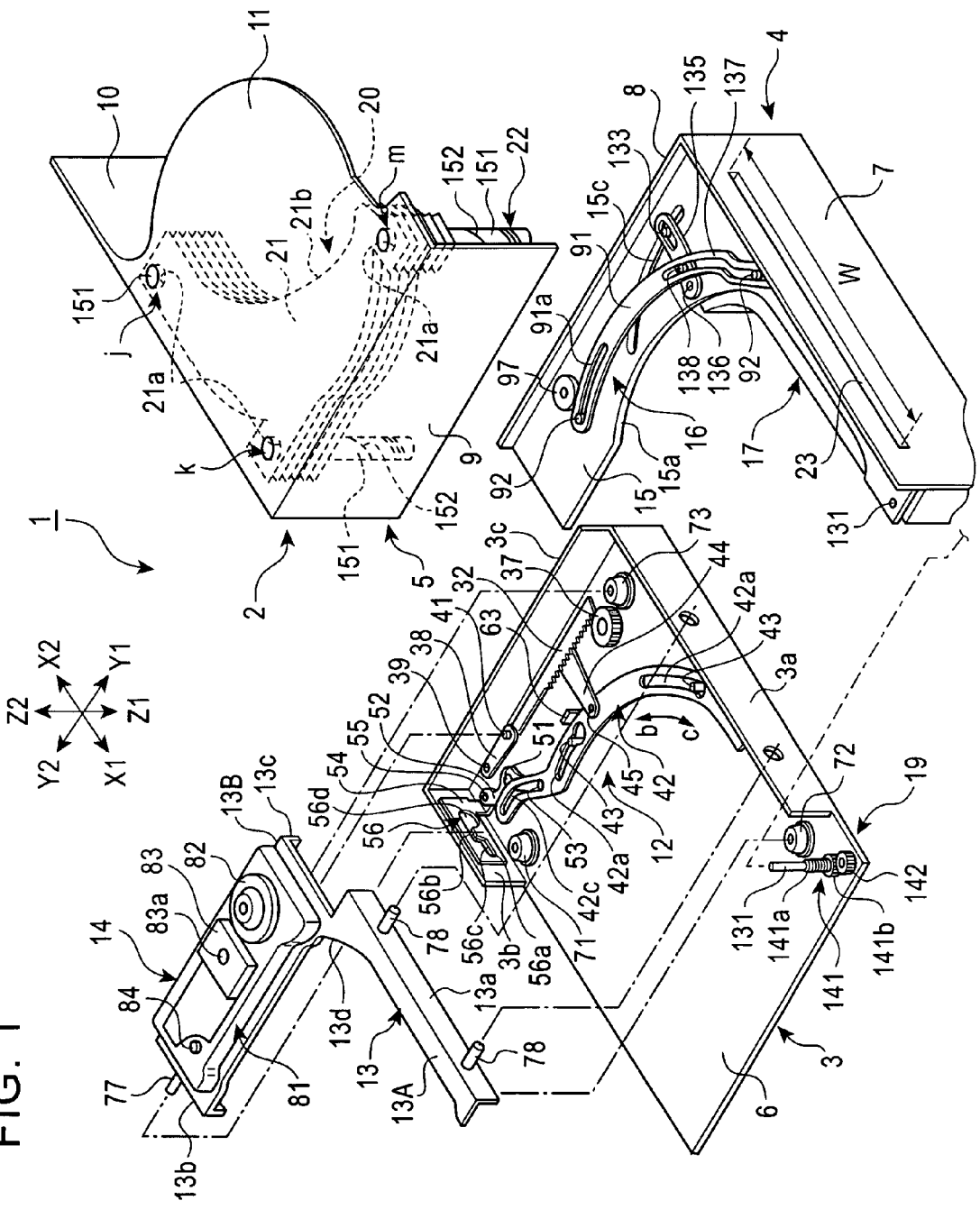
FIG. 1 is an exploded perspective view of the entire structure of a disk-storing disk device according to an embodiment of the present invention.
Figure 2A:
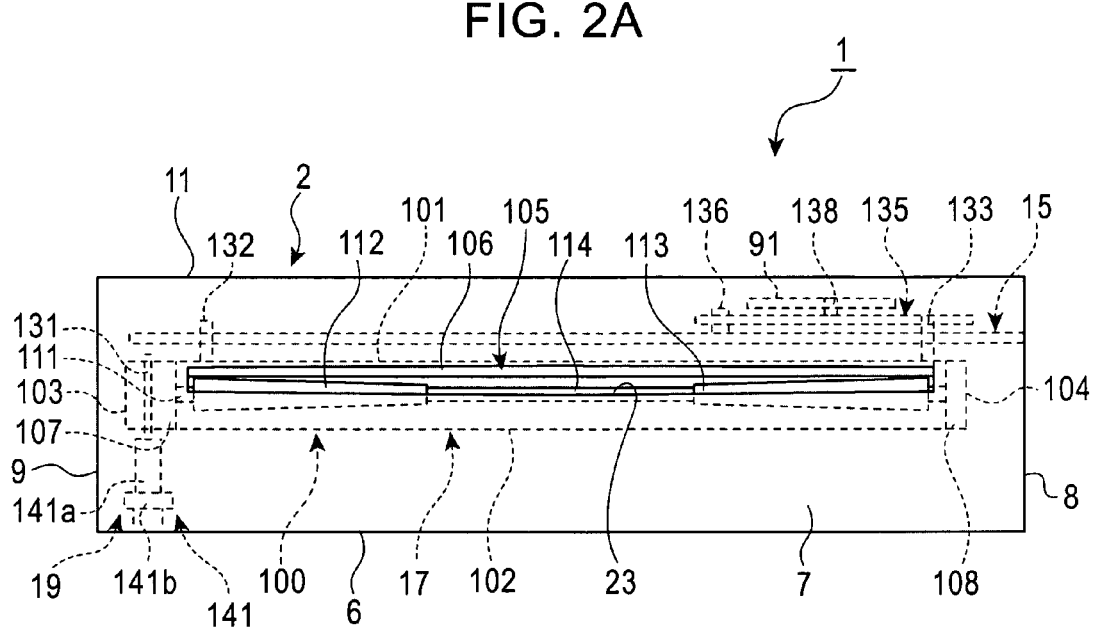
FIGS. 2A and 2B are front views of the disk-storing disk device viewed from the front face of a casing, wherein FIG. 2A mainly shows a transporting unit in the casing and FIG. 2B mainly shows a holder, holder selecting means, and a drive unit.
Figure 2B:
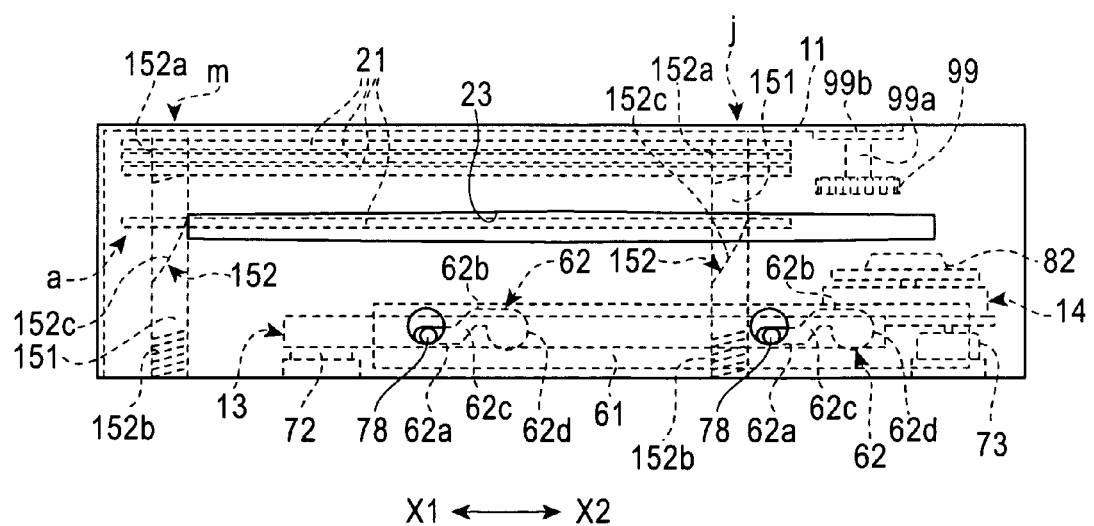
Figure 3:
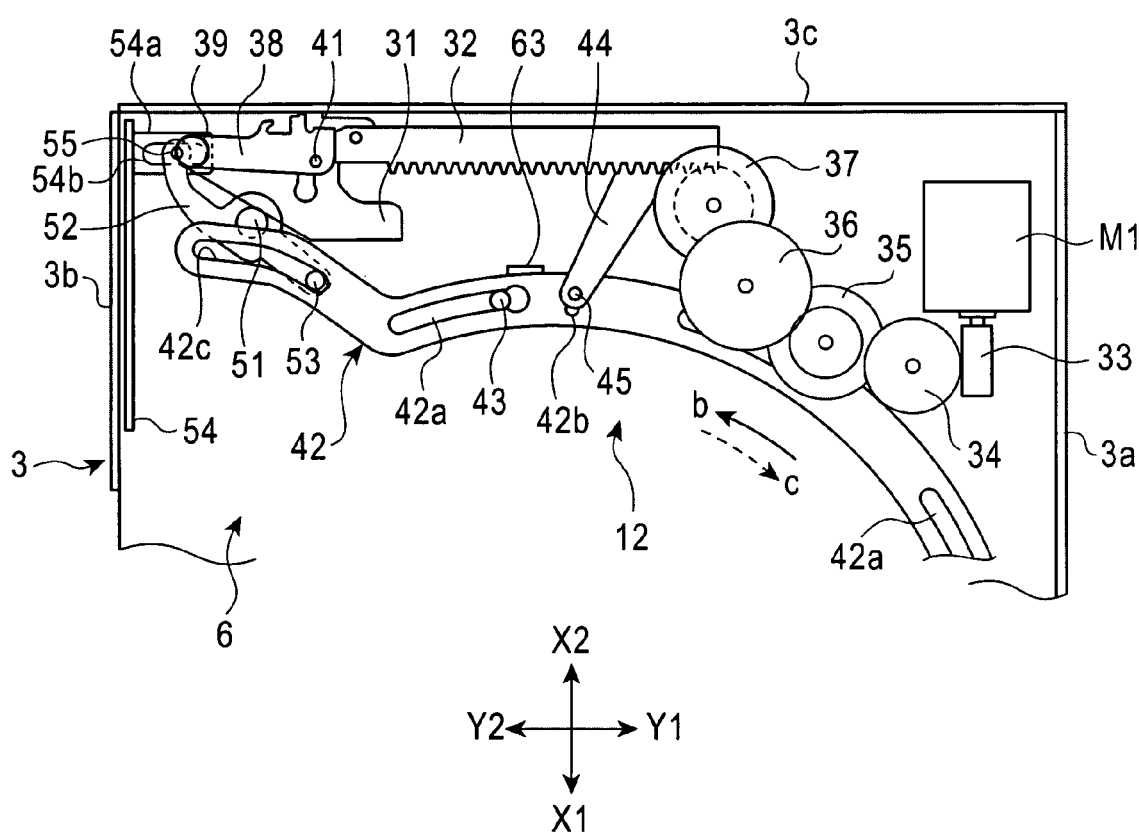
FIG. 3 is a plan view of a first power transfer unit positioned on the bottom of the casing showing the structure for every operation and a holder selection operation mode.
Figure 4:
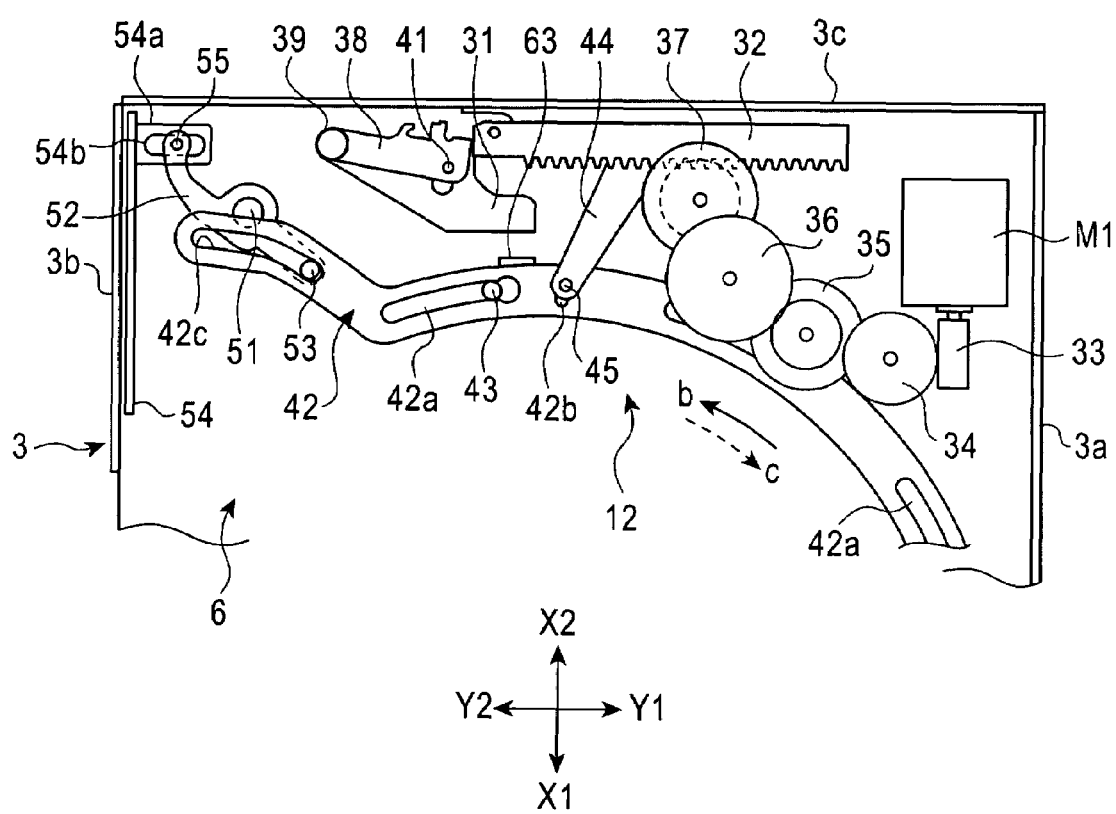
FIG. 4 is a plan view of the first power transfer unit positioned on the bottom of the casing showing the structure for every operation and a state in that the drive unit is rotated to an overlapping position.
Figure 5:
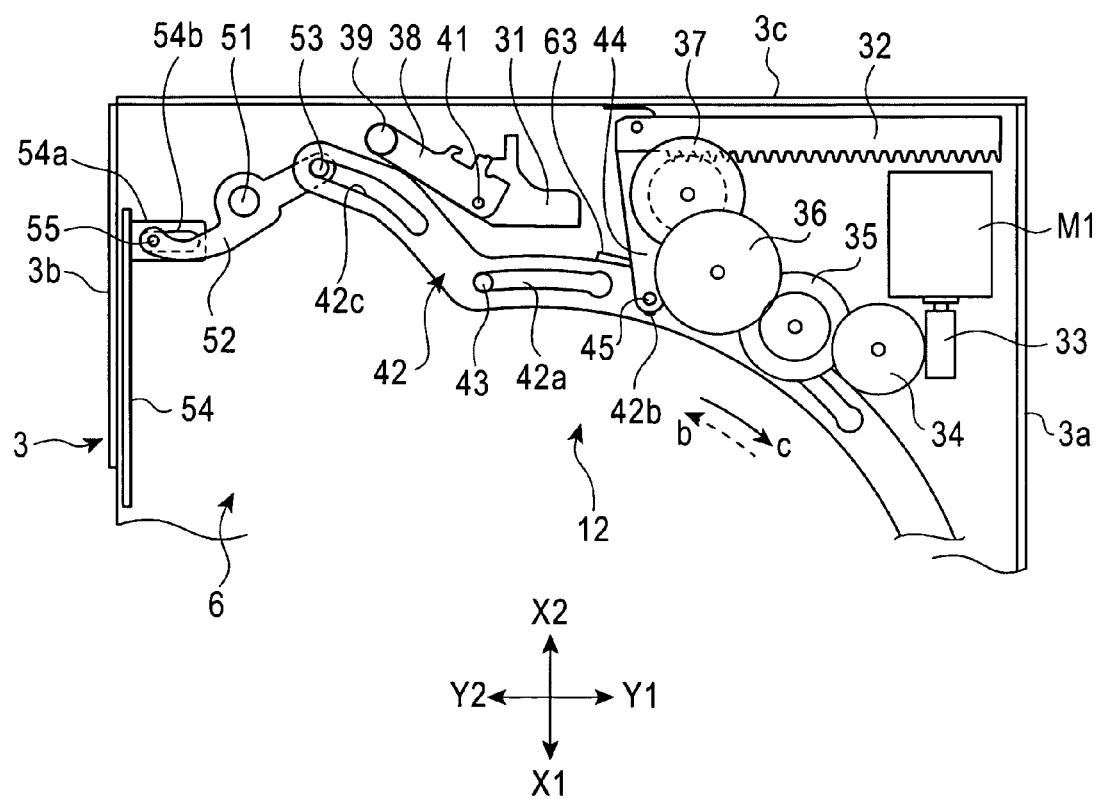
FIG. 5 is a plan view of the first power transfer unit positioned on the bottom of the casing showing the structure for every operation and a disk driving mode.
Figure 6:
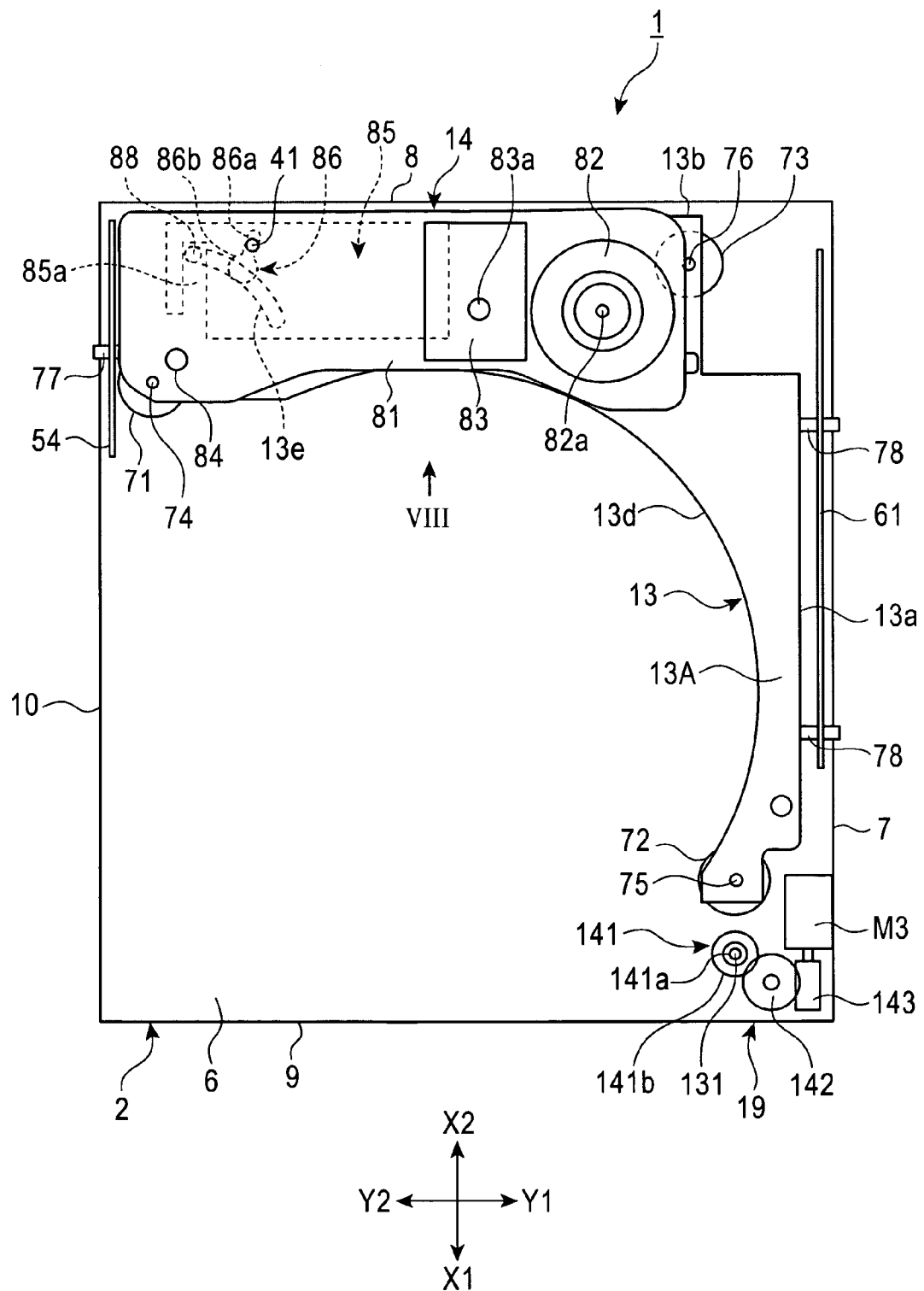
FIG. 6 is a plan view of the drive unit and its support base for every operation showing a state of the drive unit located at a withdrawn position.
Figure 7:
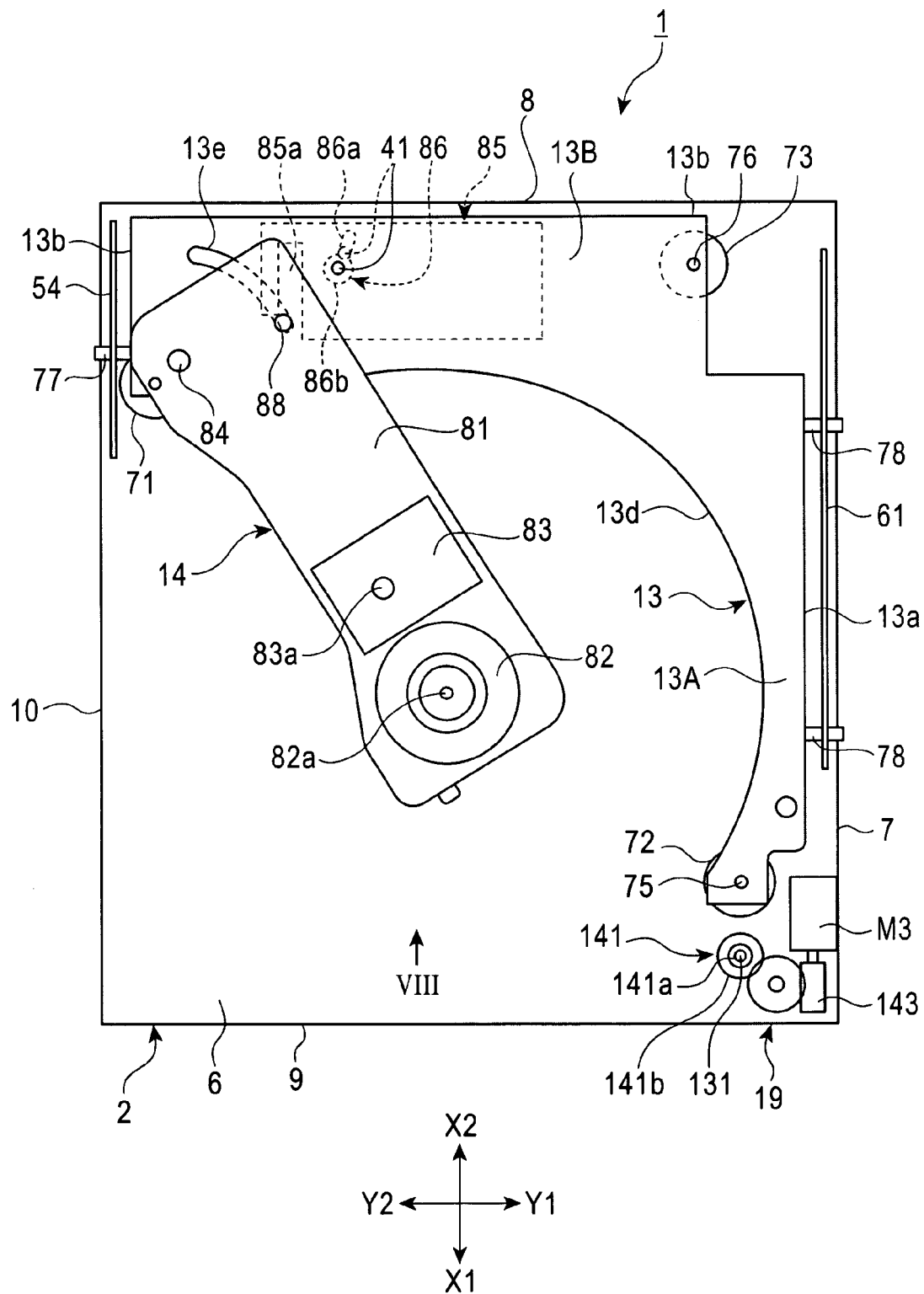
FIG. 7 is a plan view of the drive unit and its support base for every operation showing a state of the drive unit rotated to an overlapping position.
Figure 8A:
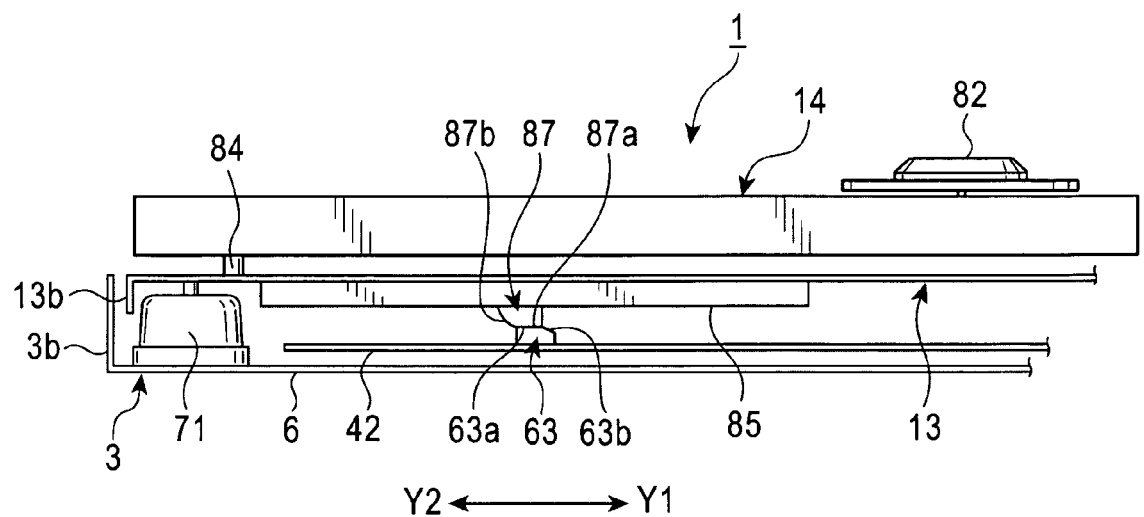
Figure 8B:
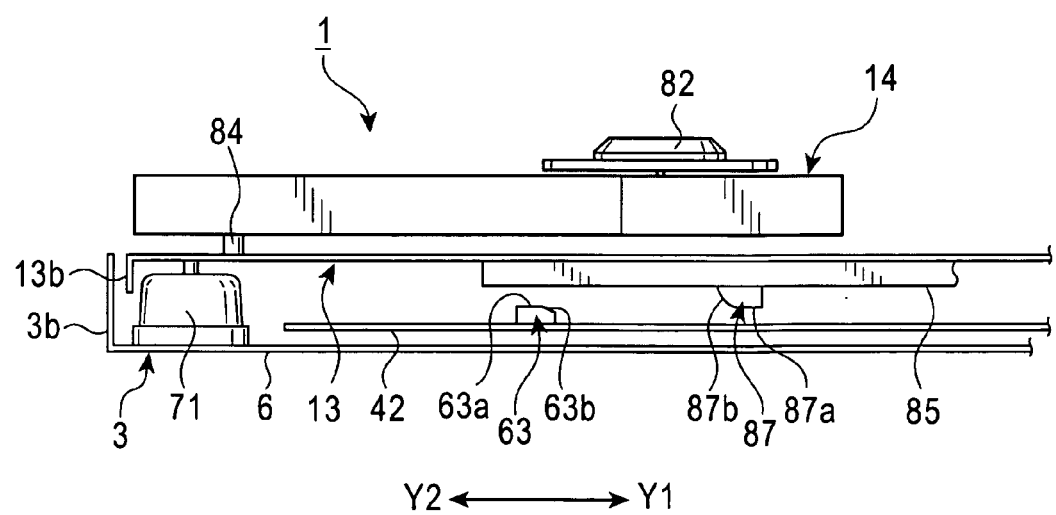
Figure 9:
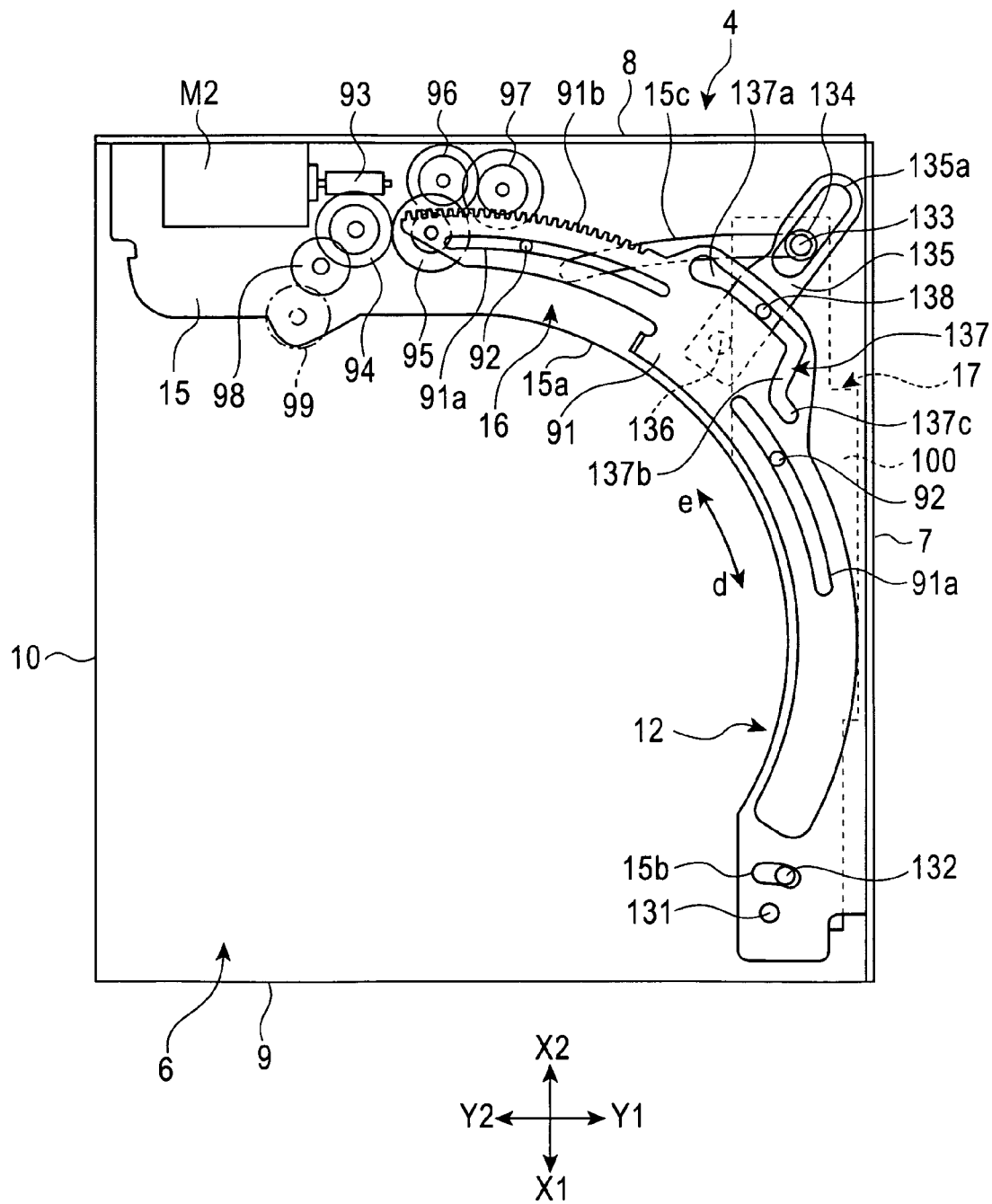
FIG. 9 is a plan view of a second power transfer unit showing the structure every operation and the holder selection operation mode.
Figure 10:
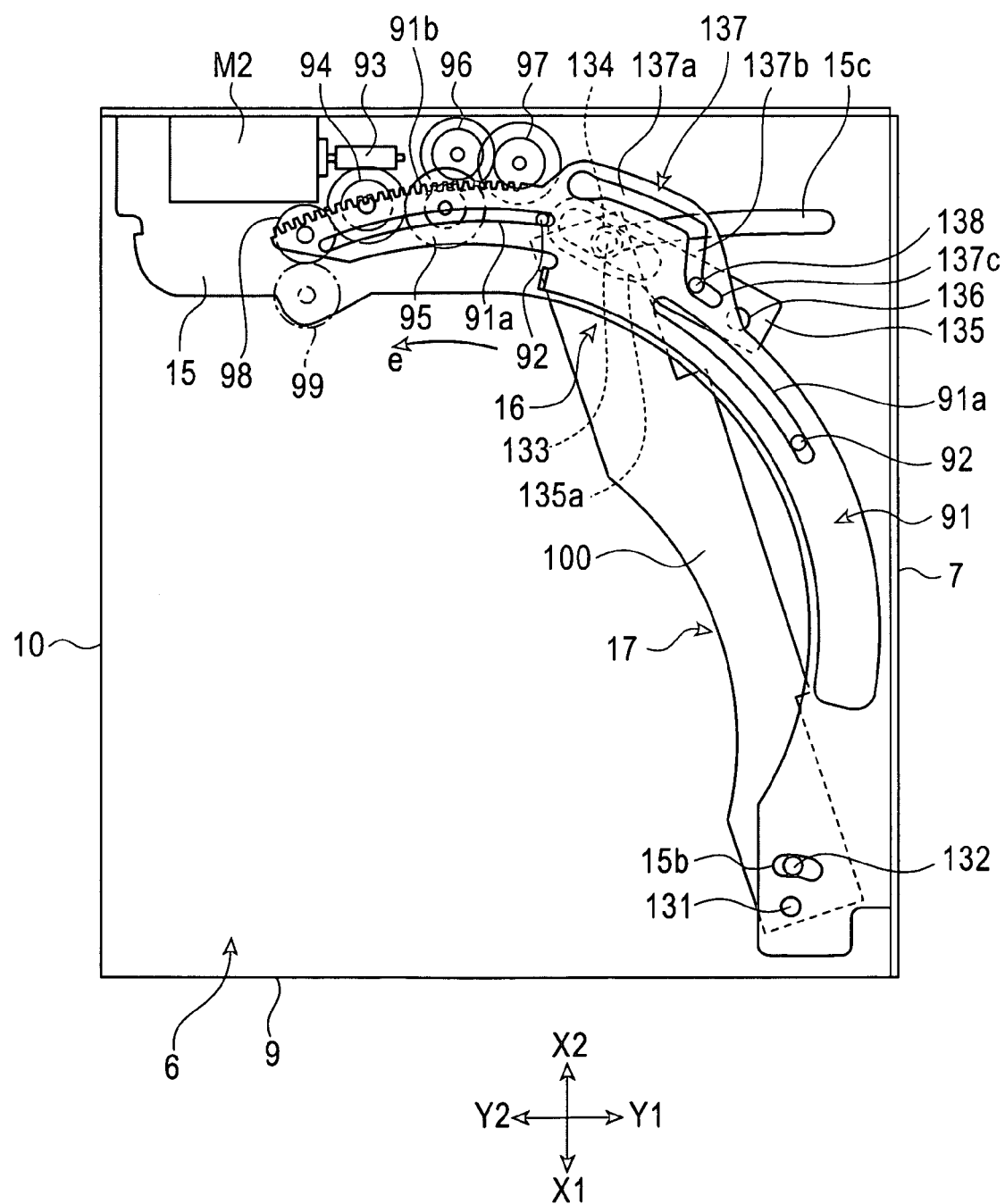
FIG. 10 is a plan view of the second power transfer unit showing the structure for every operation and a state of the transporting unit rotated to a transfer operation position.
Figure 11:
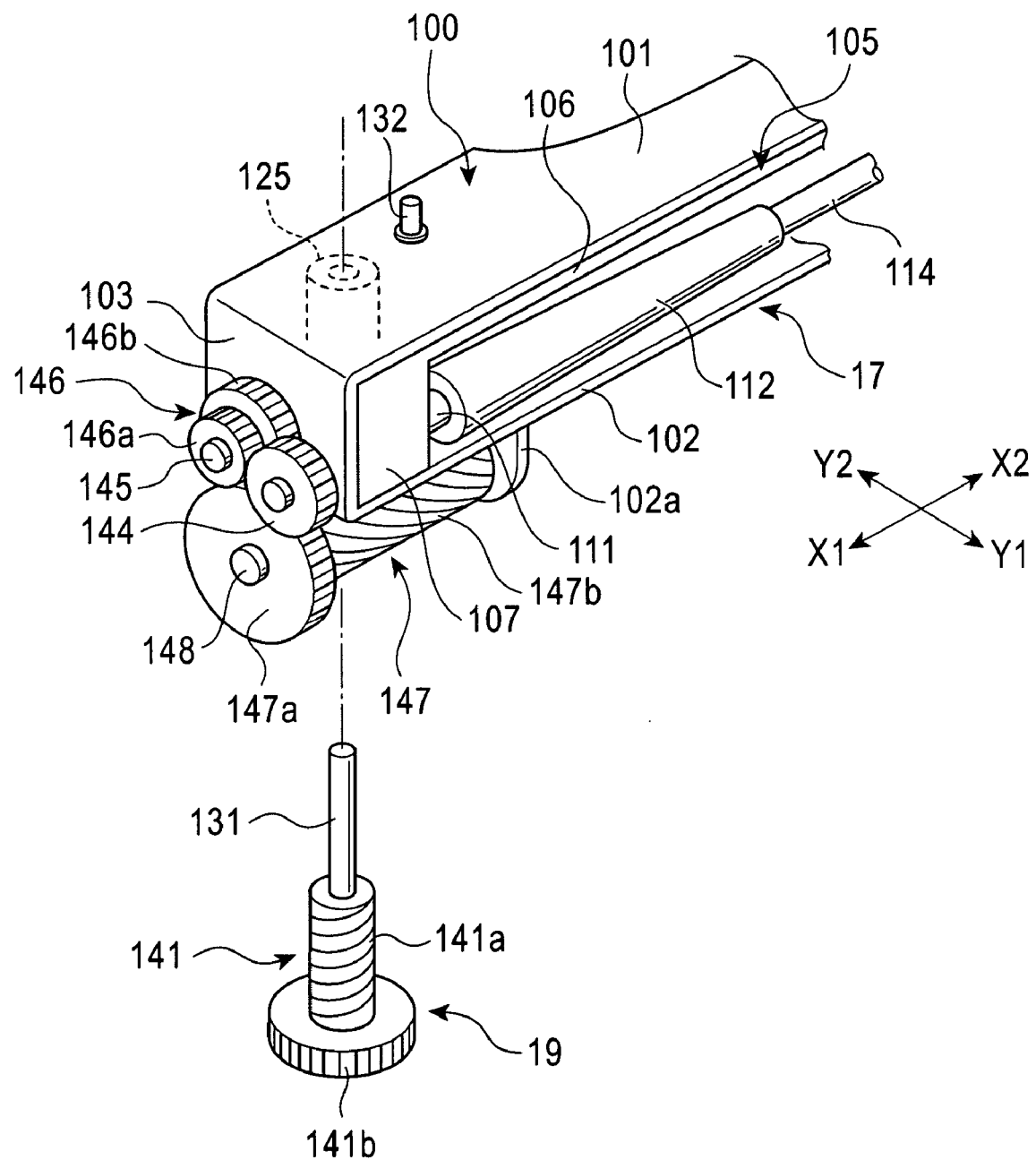
FIG. 11 is an exploded perspective view of the structures of a rotation fulcrum of the transporting unit and a power transfer path to a transfer roller showing a third power transfer unit (roller driving means)

FIG. 1 is an exploded perspective view of the entire structure of a disk-storing disk device according to an embodiment of the present invention. FIGS. 2A and 2B are front views of a casing of the disk-storing disk device viewed from the front; FIG. 2A mainly shows a transporting unit within the casing; and FIG. 2B mainly shows a holder, holder selecting means, and a drive unit. FIGS. 3 to 5 are plan views of the structure of a first power transfer unit arranged on the bottom of the casing showing it's every operation; FIGS. 6 and 7 are plan views of the drive unit and the support base showing their every operation; and FIGS. 8A and 8B show a restriction state and a restriction-released state of the support base of the drive unit, in which FIG. 8A is a side view of FIG. 6 viewed in arrow direction VIII, and FIG. 8B is a side view of FIG. 7 viewed in arrow direction VIII; FIGS. 9 to 10 are plan views of the structure of a second power transfer unit showing it's every operation; FIG. 11 is an exploded perspective view of a third power transfer unit showing the structure of the rotational fulcrum of the transporting unit and the rotational power transfer path to transfer rollers; and FIGS. 12 to 15 are plan views sequentially showing whole operations of the disk-storing disk device.

A disk-storing disk device 1 shown in FIG. 1 includes a box-shaped casing 2. Referring to FIG. 1, as reference directions of the casing 2, character Z1 denotes downside; Z2 upside; X1 first side (left side); X2 second side (right side); Y1 near side; and Y2 back side. Also, X1-X2 direction denotes lateral direction and Y1-Y2 direction depth direction.

The casing 2 includes a lower casing 3, an intermediate casing 4, and an upper casing 5 sequentially stacked in that order from the downside toward the upside. The lower casing 3 includes the bottom surface 6 of the casing 2; the intermediate casing 4 includes the front surface 7 and the right side-face 8 of the casing 2; and the upper casing 5 includes the left side-face 9, the rear surface 10, and the ceiling surface 11 of the casing 2.

The bottom surface 6 of the lower casing 3 is provided with a first power transfer unit 12 arranged on the top. On the first power transfer unit 12, a unit support base 13 is supported, on which a drive unit 14 is mounted. The intermediate casing 4 is provided with a mechanism base 15 formed in parallel with the bottom surface 6 at an upper portion, and on the mechanism base 15, a second power transfer unit 16 is provided. In the intermediate casing 4, a transporting unit 17 is arranged below the mechanism base 15 as well as inside the front surface 7. Between the end of the transporting unit 17 in the first side (X1 side) and the bottom surface 6 of the lower casing 3, a third power transfer unit 19 is provided for functioning as roller driving means.

In the upper casing 5, a disk-storing region 20 is surrounded with the left side-face 9, the rear surface 10, and the ceiling surface 11, and a plurality of holders 21 are arranged in the disk-storing region 20 for storing a disk D therein for each. According to the embodiment, there are provided the six holders 21 stacked in the thickness direction. In the upper casing 5, holder selecting means 22 is provided, and by the operation of the holder selecting means 22, any one of the six holders 21 is selected so as to move it to a selection position (a) as well as to increase the space between the selected holder and a holder 21 adjacent thereto.

The disk D is a disk of 12 cm in diameter, such as a CD (compact disk), a CD-ROM, and a DVD (digital versatile disk).

As shown in FIGS. 1 to 2B, an insertion opening 23 is opened on the front surface 7 of the casing 2. The insertion opening 23 is slit-shaped having a width in the vertical direction slightly larger than the thickness of the disk D and an opening width in the lateral direction slightly larger than the diameter of the disk D.

As shown in FIG. 2A, the transporting unit 17 is positioned at the same height as that of the insertion opening 23, so that the disk D inserted through the insertion opening 23 is conveyed toward the disk-storing region 20 by the transporting unit 17. As shown in FIG. 2B, the holder 21 among a plurality of the holders 21 arriving at the selection position (a) is positioned at the same height as that of the insertion opening 23, so that the disk D inserted through the insertion opening 23 is supplied and held to the holder 21 at the selection position (a) by being conveyed by the transporting unit 17.

Figure 12:
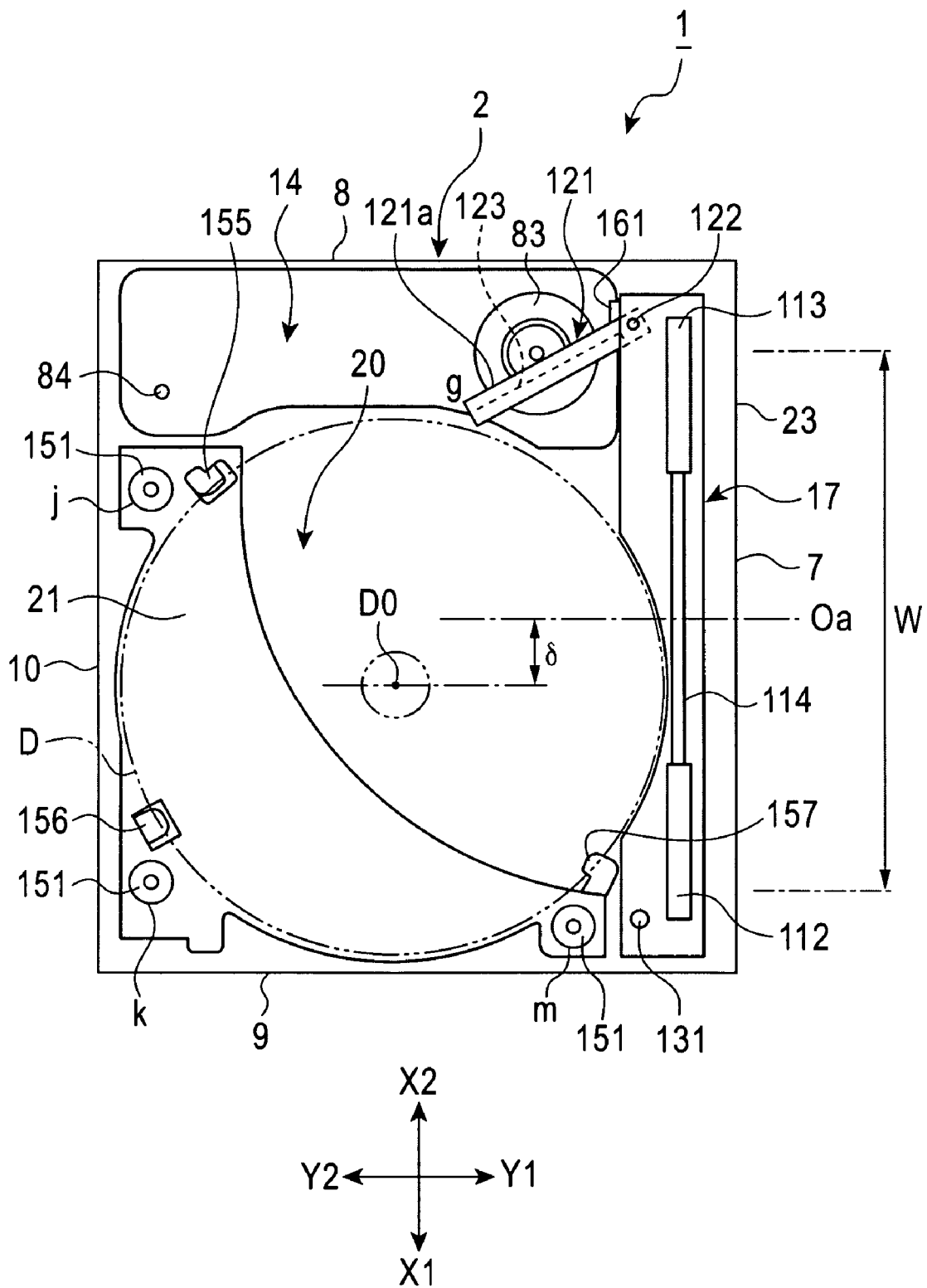
FIG. 12 is a plan view sequentially showing the entire operations of the disk-storing disk device and a holder selection operation.

FIG. 12 is a plan view of the disk-storing disk device 1 viewed from the ceiling surface 11 of the casing 2 showing the width of the insertion opening 23 with reference character W. An insertion center line Oa is designated by a phantom line dividing the width W of the insertion opening 23 into two so as to extend inside the casing 2 perpendicularly to the front surface 7. As shown in FIG. 12, the axis Do of the disk D supported by the holder 21 in the disk-storing region 20 is located at a position separated from the insertion center line Oa by a distance δ on the first side (X1 side). The distance δ is 1/10 times of the diameter of the disk D, or more.

Referring to FIG. 12, the drive unit 14 is located at an withdrawn position, which is directly inside the right side-face 8 and separated from the insertion center line Oa on the second side (X2 side). Also, the drive unit 14 is located at a position slightly separated from the outer periphery of the disk D held by the holder 21. In FIG. 12, the transporting unit 17 is located at a withdrawn position, which is directly inside the front surface 7 and slightly separated from the outer periphery of the disk D held by the holder 21.

Figure 14:
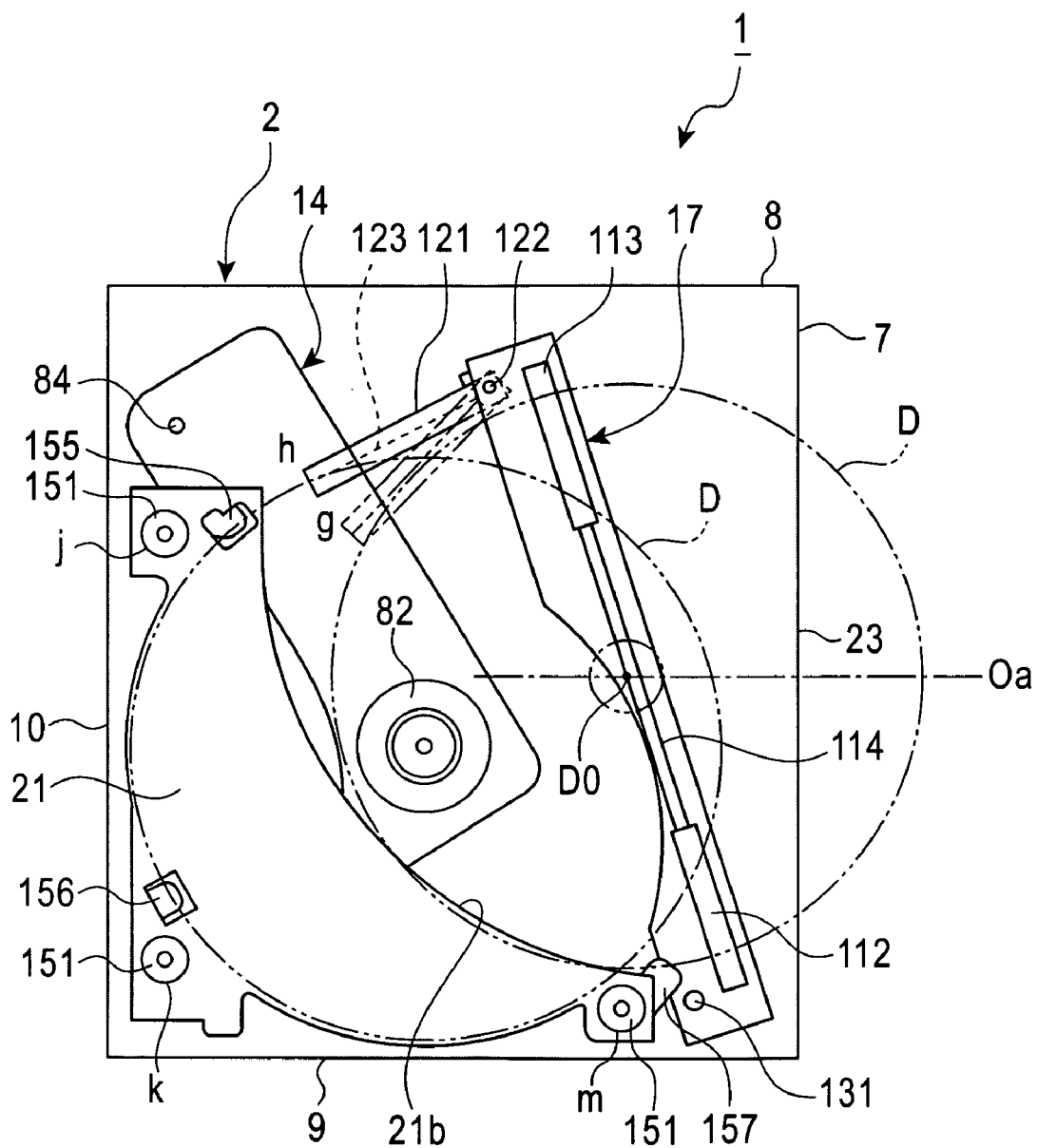
FIG. 14 is a plan view sequentially showing the entire operations of the disk-storing disk device and the disk conveying operation.
Figure 14:
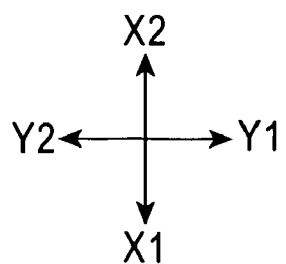

As shown in FIGS. 2A and 2B, the drive unit 14 and the transporting unit 17 are located at positions overlapping with each other in the vertical direction. As shown in FIG. 14, the drive unit 14 is clockwise rotated in the casing 2 while the transporting unit 17 counterclockwise rotated, and the rotating region of the drive unit 14 partly overlaps with that of the transporting unit 17 in plan view. The rotating region of the drive unit 14 is established to partly overlap with that of the transporting unit 17 also in the height direction. By arranging the disk-storing region 20, the drive unit 14, and the transporting unit 17 in such a manner, the internal space of the casing 2 can be efficiently utilized. In the casing 2, the transporting unit 17 and the disk-storing region 20 are arranged adjacently to each other on the near side and the back side, respectively, so that the depth length of the casing 2 can be reduced to as small as possible. According to the embodiment, the depth length of the casing 2 (dimension in Y1-Y2 direction) is less than 1DIN size.

The mechanism base 15 of the intermediate casing 4 shown in FIG. 1 is positioned above the drive unit 14 and the transporting unit 17, and the inner edge 15*a* of the mechanism base 15 extending inside (X1 direction in the drawing) is slightly spaced from the outer edge of the disk D held by the holder 21 in the disk-storing region 20. Thus, as shown in FIG. 2B, the holder 21 positioned in the highest of the disk-storing region 20 can be elevated directly below the ceiling surface 11 of the casing 2.

With reference to FIGS. 3 to 5, the structure of the first power transfer unit 12 provided on the bottom surface 6 of the casing 2 will be described.

As shown in FIG. 1, a front tab 3*a* is vertically folded from the bottom surface 6 in the front of the lower casing 3. Similarly, a rear tab 3*b* and a right tab 3*c* are vertically folded from the bottom surface 6 in the rear and on the second side thereof, respectively.

As shown in FIG. 3, the first power transfer unit 12 is provided with a slider 31 linearly moving in the direction of Y1-Y2 and a rack member 32 for moving the slider 31 arranged on the bottom surface 6. A first motor M1 is fixed on the bottom surface 6 on the near side, and to the output shaft of the first motor M1, a worm wheel 33 is fixed. The rotation power of the first motor M1 is transmitted to a pinion gear 37 via reduction gears 34 to 36. The pinion gear 37 is engaged with teeth of the rack member 32.

On the slider 31, a change-over lever 38 is provided. The end of the change-over lever 38 on the back side (Y2 side) is rotatably supported to the slider 31. From the end of the change-over lever 38 on the near side (Y1 side), a change-over drive pin 41 protrudes upward. The change-over lever 38 is provided with an attitude control pin downward extending coaxially with the change-over drive pin 41. The attitude control pin is inserted into a cam hole (not shown) formed on the bottom surface 6. When the change-over lever 38 moves in the direction of Y1 together with the slider 31, the change-over lever 38 is rotated corresponding to the shape of the cam hole.

On the bottom surface 6, a lock change-over member 42 is provided. The lock change-over member 42 is made of a metallic plate with a partly circular-arc shape in plan view, having two circular-arc elongated slide holes 42*a* and 42*a*. As shown in FIG. 1, two guide pins 43 and 43 protrude from the bottom surface 6 so as to be inserted into the elongated slide holes 42*a* and 42*a*, respectively. By the sliding of the elongated slide holes 42*a* and 42*a* through the guide pins 43 and 43, the lock change-over member 42 can slide in direction (b), which is back side of the casing 2, and in direction (c), which is near side, along a circular arc trajectory.

On the bottom surface 6, a connection rotation lever 44 is rotationally supported. The lock change-over member 42 is provided with a connection elongated hole 42*b* formed so as to extend in its width direction, so that a connection pin 45 provided at an end of the connection rotation lever 44 is inserted into the connection elongated hole 42*b*. As shown in FIG. 5, the connection rotation lever 44 is counterclockwise rotated by the rack member 32 moving in the direction of Y1, so that the lock change-over member 42 is moved in the direction (c) by the rotation of the connection rotation lever 44.

The lock change-over member 42 is provided with a change-over elongated hole 42*c* formed at the end on the back side. On the back-side bottom surface 6, a transfer member 52 is supported rotatably about a shaft 51. At the end of the transfer member 52 on the near side, a connection pin 53 is fixed and inserted into the change-over elongated hole 42*c*. As shown in FIG. 1, a locking member 54 is provided inside the rear tab 3*b*. The locking member 54 is plate-shaped and supported so as to move linearly in the direction of X1-X2 inside the rear tab 3*b*. As shown in FIG. 3, the locking member 54 is provided with a folded piece 54*a* folded from the lower edge along the bottom surface 6 so as to have an elongated hole 54*b* formed thereon. At the end of the transfer member 52 on the back side, a connection pin 55 is fixed and inserted into the elongated hole 54*b*.

When the lock change-over member 42 moves from the position shown in FIG. 4 in the direction (c), the transfer member 52 is counterclockwise rotated with the change-over elongated hole 42*c*, thereby moving the locking member 54 in the direction of X1.

As shown in FIG. 1, the locking member 54 is provided with a lock control hole 56 opened thereon. The lock control hole 56 includes a restriction part 56*a* formed at a position on X1 side and close to the bottom surface 6, a raising part 56*b* positioned above the restriction part 56*a*, and an inclination part 56*c* continuously connecting between the restriction part 56*a* and the raising part 56*b*. Furthermore, at the end of the raising part 56*b* on X2 side, a comparatively large circular clearance hole 56*d* is formed.

A locking member 61 is also provided inside the front tab 3*a* of the lower casing 3. The locking member 61 is shown in FIG. 2B. The locking member 61 is connected to the lock change-over member 42, and supported inside the front tab 3*a* slidably in the direction of X1-X2. As shown in FIGS. 1, 3, and 4, when the lock change-over member 42 moves in the direction (b), the locking member 61 is positioned on X2 side, as shown in FIG. 2B. While the lock change-over member 42 is moving in the direction (c) from the position shown in FIG. 4 toward the position shown in FIG. 5, the locking member 61 is moved in the direction X1 by the movement of the lock change-over member 42.

As shown in FIG. 2B, the locking member 61 is provided with a pair of lock control holes 62 opened thereon. Each of the lock control holes 62 includes a restriction part 62*a* formed at a position on X1 side and close to the bottom surface 6, a raising part 62*b* positioned above the restriction part 62*a*, and an inclination part 62*c* continuously connecting between the restriction part 62*a* and the raising part 62*b*. Furthermore, at the end of the raising part 62*b* on X2 side, a comparatively large circular clearance hole 62*d* is formed.

As shown in FIGS. 1, 3, and 8A, the lock change-over member 42 is provided with an intermediate restriction part 63 formed in the vicinity of the connecting point to the connection rotation lever 44 by upward folding part of the lock change-over member 42. As shown in FIG. 8A, the top surface of the intermediate restriction part 63 is an abutment surface 63*a*, and on Y1 side of the abutment surface 63*a*, an inclination part 63*b* is formed, which descends in the direction of Y1 toward the bottom surface 6 linearly or curvedly.

The operation of the first power transfer unit 12 is now described. As shown in FIG. 3, when the rack member 32 moves in the direction of Y2, the slider 31 and the change-over lever 38 are positioned on Y2 side and the lock change-over member 42 moves in the direction (b) at this time. Meanwhile, both the locking member 54 shown in FIG. 1 and the locking member 61 shown in FIG. 2B move in the direction of X2.

While the rack member 32 is moved in the direction of Y1 by the power of the first motor M1 from the position shown in FIG. 3 toward the position shown in FIG. 4, the slider 31 and the change-over lever 38 move in the direction of Y1 together with the rack member 32, and at its final stage, the change-over lever 38 is clockwise rotated slightly. However, while the rack member 32 is moving from the position of FIG. 3 to the position of FIG. 4, the lock change-over member 42 stops at the position moved in the direction (b) and it does not move in the direction (c).

When the rack member 32 further moves in the direction of Y1 from the position of FIG. 4 to the position of FIG. 5, the slider 31 is restricted by a cam hole (not shown) formed on the bottom surface 6, so that only the rack member 32 is separated from the slider 31 so as to move in the direction of Y1. While the rack member 32 is moved from the position of FIG. 4 to the position of FIG. 5, the connection rotation lever 44 is counterclockwise rotated so as to move the locking member 54 provided inside the rear tab 3b in the direction of X1. Moreover, the locking member 61 provided inside the front tab 3a is moved from the position of FIG. 2B in the direction of X1.

Directly before the lock change-over member 42 reaches the position of FIG. 5, the change-over lever 38 is slightly moved from the position of FIG. 4 in the direction of Y1 by the movement of the rack member 32, so that a control pin provided in the change-over lever 38 is controlled by a cam hole formed on the bottom surface 6, thereby largely rotating the change-over lever 38 clockwise as shown in FIG. 5.

The unit support base 13 shown in FIG. 1 is formed by bending a metallic plate. In front of the unit support base 13, a front tab 13a is provided, which is arranged inside the front tab 3a of the lower casing 3 in parallel therewith. The unit support base 13 is also provided with a rear tab 13b arranged inside the rear tab 3b of the lower casing 3 in parallel therewith. A side tab 13c of the unit support base 13 is arranged inside the right tab 3c of the lower casing 3 in parallel therewith.

As shown in FIGS. 6 and 7, the internal edge 13d of the unit support base 13 is concave circular-arc shaped, and located at a position slightly separated from the outer periphery of the disk D held by the holder 21 in the disk-storing region 20 shown in FIG. 1. While the holders 21 are vertically moved by the holder selecting means 22, the unit support base 13 is not to be abutted to the outer periphery of the disk D.

As shown in FIGS. 1, 6, and 7, on the bottom surface 6 of the lower casing 3, three dampers 71 to 73 are fixed as elastic support members. Each of the dampers 71 to 73 is a flexible bag made of rubber, etc., in which liquid such as oil or gas is enclosed. Alternatively, the bag may be combined with a compression spring.

As shown in FIGS. 6 and 7, on the bottom surface of the unit support base 13, three support shafts 74 to 76 are fixed vertically downward. The support shaft 74 is supported on the damper 71; the support shaft 75 on the damper 72; and the support shaft 76 on the damper 73. The unit support base 13 is elastically supported on the bottom surface 6 with the dampers 71 to 73.

The rear tab 13b of the unit support base 13 is provided with one restriction shaft 77 protruding in the direction of Y2, which is inserted into the lock control hole 56 of the locking member 54 shown in FIG. 1. The front tab 13a of the unit support base 13 is provided with a pair of restriction shafts 78 and 78 protruding in the direction of Y1 so as to be inserted into the lock control holes 62 of the locking member 61 shown in FIG. 2B, respectively.

As shown in FIGS. 6 and 7, the drive unit 14 includes a slender drive base 81, and at the end of the drive base 81 on the near side (Y1 side), a rotation drive unit is provided. The rotation drive unit includes a spindle motor supported on the drive base 81 and a turntable 82 fixed to a rotation shaft 82a of the spindle motor. An optical head 83 is provided on the drive base 81, and an object lens 83a is provided on the top of the optical head 83. On the drive base 81, a thread mechanism is provided, and the optical head 83 is moved by the thread mechanism from the position close to the turntable 82 toward the position separated from the turntable 82. At this time, the object lens 83a of the optical head 83 can move in the radial direction of the disk D clamped by the turntable 82.

On the back side (Y2 side) of the unit support base 13, a support shaft 84 (first fulcrum) upward protrudes vertically, and the drive base 81 is supported about the support shaft 84, so that the drive unit 14 is rotatable along X-Y plane. The rotatable range of the drive unit 14 is between the withdrawn position shown in FIG. 6 and the overlapping position shown in FIG. 7. As shown in FIG. 6, when the drive unit 14 is located at the withdrawn position, the turntable 82 is positioned on the side of the front surface 7 of the casing 2, and the side of the drive base 81 is positioned close to the right side-face 8 of the casing 2 in parallel therewith. The drive unit 14 located at the withdrawn position is slightly separated from the outer edge of the disk D held by the holder 21 in the disk-storing region 20.

As shown in FIG. 7, when the drive unit 14 is rotated to the overlapping position, the turntable 82 moves into the disk-storing region 20. At this overlapping position, the turntable 82 is coaxial with the disk D held by the holder 21 moved to the selection position (a) in the vertical direction.

As shown in FIGS. 6 and 7, the unit support base 13 includes a circular guide part 13e shaped in a circular arc with a predetermined radius about the support shaft 84. The circular guide part 13e is a circular arc elongated hole penetrating the unit support base 13. To the drive base 81, a drive shaft 88 is fixed so as to protrude downward, and the drive shaft 88 is inserted into the circular guide part 13e downward from above.

As shown in FIGS. 6 and 7, and further in FIGS. 8A and 8B, a drive slider 85 is provided on the bottom surface of the unit support base 13, and the drive slider 85 is supported slidably in the direction of Y1-Y2. The drive slider 85 is provided with a drive recess 85a formed at the end on Y2 side, into which the drive shaft 88 is inserted.

In the drive slider 85, a drive hole 86 is formed, in which a change-over drive pin 41 is inserted which protrudes from the change-over lever 38 provided in the first power transfer unit 12 shown in FIGS. 1 and 3. The drive hole 86 includes a slender drive part 86a extending in the direction of X1-X2 and a clearance part 86b formed at the end of the drive part 86a on X1 side. The drive part 86a has a width capable of restricting the change-over drive pin 41 and the clearance part 86b has a diameter sufficiently larger than that of the change-over drive pin 41.

The drive slider 85 made of a synthetic resin, as shown in FIGS. 8A and 8B, is provided with a movable restriction part 87 integrally protruded from the bottom surface. On the bottom surface of the movable restriction part 87, there are formed an abutment surface 87a and an inclination part 87b, which ascends in the direction of Y2 linearly or curvedly. As shown in FIGS. 6 and 8A, when the drive slider 85 moves in the direction of Y2, the abutment surface 87a of the movable restriction part 87 abuts the abutment surface 63a of the intermediate restriction part 63 provided in the lock change-over member 42, so that the unit support base 13 is supported from below.

While the rack member 32 provided in the first power transfer unit 12 is moving in the direction of Y1 from the position of FIG. 3 to the position of FIG. 4, as shown FIGS. 6 and 7, the change-over drive pin 41 moving in the direction of Y1 together with the rack member 32 is positioned in the drive part 86a of the drive hole 86, so that the moving force of the change-over drive pin 41 in the direction of Y1 is transmitted to the drive slider 85. Thus, the drive slider 85 is moved in the direction of Y1 from the position of FIG. 6 to the position of FIG. 7. Meanwhile, the drive shaft 88 is pushed in the direction of Y1 by the drive recess 85a provided in the drive slider 85, so that the drive unit 14 is rotated from the withdrawn position of FIG. 6 to the overlapping position of FIG. 7. Directly after the drive slider 85 moved in the direction of Y1 from the position of FIG. 6 to the position of FIG. 7, as shown in FIG. 8B, the movable restriction part 87 provided in the drive slider 85 is removed from the intermediate restriction part 63.

While the rack member 32 is further moving in the direction of Y1 from the position of FIG. 4 to that of FIG. 5, the slider 31 and the change-over lever 38 do not move as described above, so that the drive unit 14 is maintained at the overlapping position shown in FIG. 7. Then, when the rack member 32 moves to the position of FIG. 5, the lock change-over member 42 moves in the direction (c), and the change-over lever 38 is largely rotated clockwise at this time as shown in FIG. 5. Thereby, as shown in FIG. 7, the change-over drive pin 41 provided in the change-over lever 38 enters the clearance part 86b of the drive hole 86 in the drive slider 85, so that the engagement between the change-over drive pin 41 and the drive slider 85 is cancelled.

According to the embodiment, the change-over lever 38 and the drive slider 85 constitute drive unit rotating means for rotating the drive unit 14.

Then, with reference to FIGS. 9 and 10, the structure of the second power transfer unit 16 provided in the intermediate casing 4 will be described.

The second power transfer unit 16 is provided with a circular change-over member 91 arranged on the mechanism base 15 of the intermediate casing 4. In the change-over member 91, a pair of guide elongated holes 91a and 91a are formed so as to extend along a circular arc fulcrum. On the mechanism base 15, a pair of guide shafts 92 and 92 are fixed so as to upward extrude, and are inserted into the guide elongated holes 91a and 91a, respectively. With this support mechanism, the change-over member 91 is slidably guided along the circular arc fulcrum in the directions (d) and (e). Also, on the outer peripheral edge of the change-over member 91, rack teeth 91b are formed along the circular arc fulcrum.

On the mechanism base 15, a second motor M2 is arranged. To the rotation shaft of the second motor M2, a worm gear 93 is fixed. On the mechanism base 15, an output gear 94 is provided, which is always engaged with the worm gear 93.

The rotation of the second motor M2 is reduced and transmitted to a pinion gear 97 from the output gear 94 via gears 95 and 96. The pinion gear 97 is always engaged with the rack teeth 91b of the change-over member 91. On the side of the output gear 94, a change-over gear 98 is arranged for transmitting the power of the second motor M2 to the holder selecting means 22 shown in FIG. 1. On the mechanism base 15, there is provided switching means for moving the change-over gear 98 to a position engaging with the output gear 94 as well as moving it to a position canceling the engagement with the output gear 94. The switching means may also be operated by a motor different from the first and second motors M1 and M2.

As shown in FIG. 2B, in the upper casing 5, a transfer gear 99 is rotatably provided for transmitting the rotating power to the holder selecting means 22. The transfer gear 99, as shown FIGS. 9 and 10, can be brought into engagement with the change-over gear 98.

As shown in FIGS. 1, 9, and 10, the transporting unit 17 is provided below the mechanism base 15. As shown in FIGS. 2A and 11, the transporting unit 17 includes a metallic unit frame 100 extending in the direction of X1-X2 in a strip. The unit frame 100 includes the top surface 101, the bottom surface 102, the side face 103 on the fulcrum side, and the side face 104 at the free end. The inside of the unit frame 100 is penetrated in the direction of Y1-Y2. Inside the unit frame 100, a slide member (clamp member) 105 made of a synthetic resin with a low frictional coefficient is provided. The slide member 105 includes a clamp part 106 extending along the internal surface of the top surface 101 of the unit frame 100, a side guide part 107 arranged inside the side face 103 on the fulcrum side, and a side guide part 108 arranged inside the side face 104 at the free end. The opposing space between the side guide part 107 and the side guide part 108 is larger than the diameter of the disk D and also is similar to the opening width of the insertion opening 23 or slightly larger than that.

As shown in FIGS. 2A and 11, in the transporting unit 17, a roller shaft 111 is provided within the unit frame 100. The roller shaft 111 extends in parallel with the top surface 101 of the unit frame 100, and both ends of the roller shaft 111 are rotatably supported to the side face 103 on the fulcrum side and the side face 104 at the free end, respectively. As also shown in FIGS. 2A and 12, around the roller shaft 111, a first transfer roller 112 and a second transfer roller 113 are provided, which are made of a material with a high frictional coefficient such as synthetic rubber and natural rubber. The first transfer roller 112 and the second transfer roller 113 are spaced in the axial direction. When the transporting unit 17 is located at the standby position shown in FIGS. 12, 13, and 15, the first transfer roller 112 and the second transfer roller 113 are arranged substantially in parallel with the front surface 7 of the casing 2 as well as at positions laterally spaced from an insertion center line Oa by the same distance.

An intermediate part 114 positioned at the intermediate between the first transfer roller 112 and the second transfer roller 113 does not substantially apply a transfer force to the disk D. The intermediate part 114 is made integrally with the first and second transfer rollers 112 and 113 with a diameter smaller than those of the first and second transfer rollers 112 and 113, or the roller shaft 111 is directly exposed.

As shown in FIGS. 2A and 11, the first transfer roller 112 and the second transfer roller 113 oppose the clamp part 106 of the slide member 105. At least one of the first and second transfer rollers 112 and 113 and the clamp part 106 is urged by a spring, so that the first and second transfer rollers 112 and 113 and the clamp part 106 are elastically pressed in contact with each other. Therefore, the disk D can be clamped with between the first transfer roller 112 and the clamp part 106 and between the second transfer roller 113 and the clamp part 106. In this pressing state, the space between the intermediate part 114 and the clamp part 106 is larger than the thickness of the disk D, so that the disk D cannot be clamped between the intermediate part 114 and the clamp part 106.

The first transfer roller 112 and the second transfer roller 113 are rotatably inserted around the circumference of the roller shaft 111 without adhesion to the circumference of the roller shaft 111. When the clamping force to the disk D is applied to the first and second transfer rollers 112 and 113, the frictional force increases between the first and second transfer rollers 112 and 113 and the roller shaft 111 so that the roller shaft 111 is rotated integrally with the first and second transfer rollers 112 and 113. Also, if a large force is applied to the disk D during transferring such as when the clamped disk D is gripped by human fingers, the roller shaft 111 is constructed so as to be able to rotate slipping off the first and second transfer rollers 112 and 113.

According to the embodiment, the clamp part 106 is made of a synthetic resin with a low frictional coefficient; alternatively, the clamp part 106 may be a freely rotatable roller.

As shown FIGS. 12 to 15, on the free end side of the transporting unit 17, a pressing guide member 121 is provided. The pressing guide member 121 is a long and linearly expandable member, and is rotatably supported at its base by the transporting unit 17 via a shaft 122 extending in the vertical direction. The pressing guide member 121 is counterclockwise urged by an urging member such as a torsion spring (not shown). At the initial attitude (g) shown in FIGS. 12, 13, and 15, the urged pressing guide member 121 is restricted so as not to rotate counterclockwise therefrom. This restriction is made by arranging a stopper in the unit frame 100.

On opposing side faces 121a of the pressing guide member 121, guide grooves 123 are formed so as to extend in the longitudinal direction along the opposing side faces 121a. The guide groove 123 is positioned at the same height as that of the pressing boundary line between the first and second transfer rollers 112 and 113 and the clamp part 106. The guide groove 123 has a predetermined depth in the width direction of the pressing guide member 121, and an opening width of the groove slightly larger than the thickness of the disk D. The guide grooves 123 are formed along almost the entire length of the opposing side faces 121a.

Figure 13:
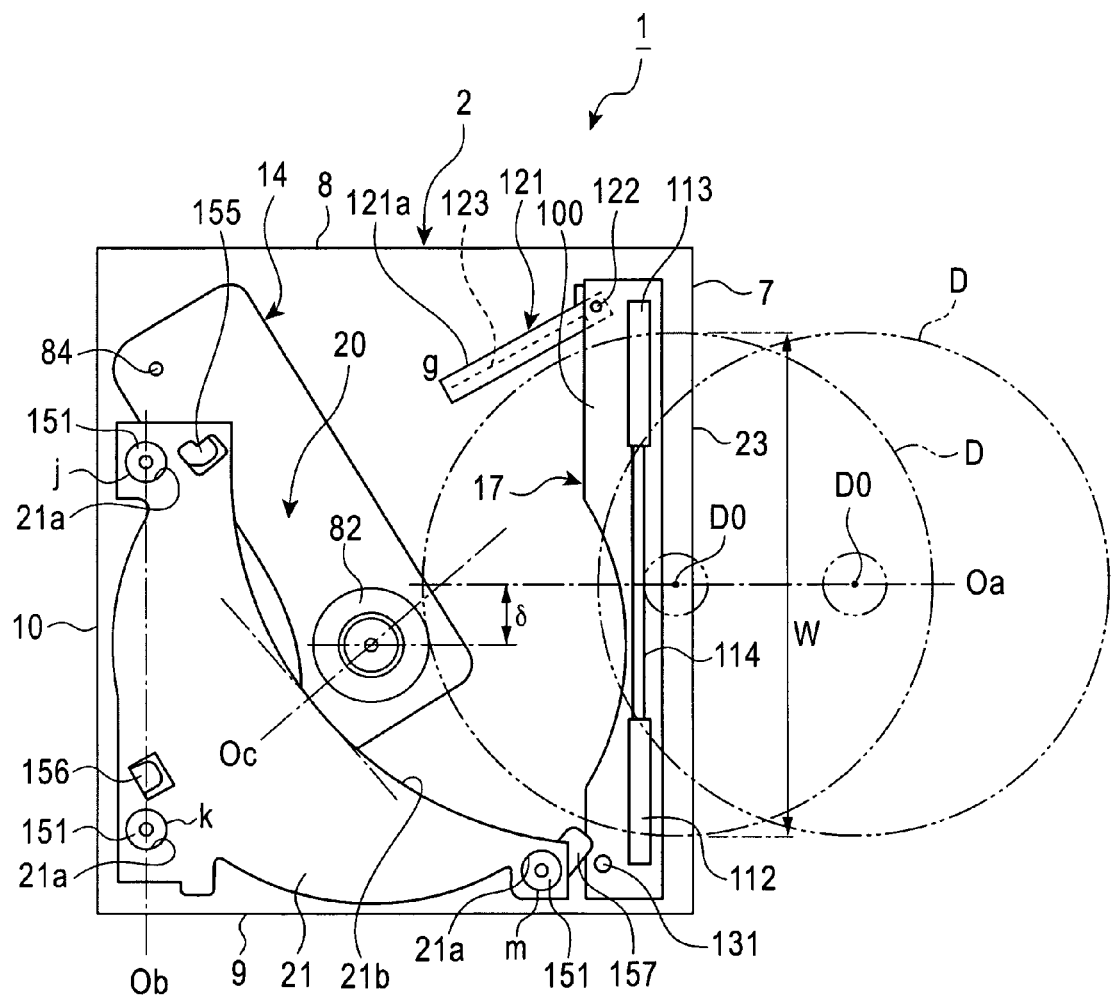
FIG. 13 is a plan view sequentially showing the entire operations of the disk-storing disk device and a disk conveying operation.

As shown in FIG. 13, when the disk D inserted through the insertion opening 23 is conveyed into the casing 2 by being clamped between the first and second transfer rollers 112 and 113 and the clamp part 106, the pressing guide member 121 does not touch the outer periphery of the disk D at first. As shown in FIG. 14, when the disk center Do of the disk D almost comes to the intermediate part 114 of the transporting unit 17, the outer edge of the disk D enters the guide groove 123 of the pressing guide member 121. Then, the pressing guide member 121 is clockwise rotated with the outer edge of the disk D and is spread out to the extended position (h) shown in FIG. 14. At this time, a pressing force is to be applied to the disk D from the pressing guide member 121 in the direction of the first side (X1 side).

The transporting unit 17 is to be rotated from the standby position shown in FIG. 9 toward the transfer operation position shown in FIG. 10 using the end on X1 side as a fulcrum. At the standby position shown in FIG. 9, as shown in FIG. 12, the unit frame 100 is positioned inside the front surface 7 of the casing 2 and the roller shaft 111 extends almost in the direction of X1-X2. The transporting unit 17 located at the standby position is slightly separated from the outer edge of the disk D supported by the holder 21 in the disk-storing region 20, and furthermore, the end of the pressing guide member 121 is also separated slightly from the outer edge of the disk D.

When the transporting unit 17 is counterclockwise rotated to the transfer operation position using the first side (X1 side) as a fulcrum as shown in FIG. 14, the disk D is transferred toward the holder 21 by the rotation of the first and second transfer rollers 112 and 113. At this time, the pressing guide member 121 is spread out to the extended position (h) with the outer edge of the disk D.

As shown in FIGS. 1, 2A, and 11, a fulcrum shaft 131 to be the rotational fulcrum of the transporting unit 17 (second fulcrum) is fixed so as to vertically extend upward from the bottom surface 6 of the lower casing 3. As shown in FIG. 11, the transporting unit 17 is provided with a bearing part 125 arranged at the end on X1 side so as to extend in a direction perpendicular to the roller shaft 111. The bearing part 125 is rotatably supported to the fulcrum shaft 131. As shown in FIG. 13, the fulcrum shaft 131 and the bearing part 125 are located at a position separated from the outer periphery of the disk D transferred by the transporting unit 17.

In the second power transfer unit 16 shown in FIGS. 9 and 10, a circular guide hole 15b is opened on X1 side of the mechanism base 15 of the intermediate casing 4, and a circular guide hole 15c is also opened on X2 side. Both the guide hole 15b and the guide hole 15c extend along a circular arc trajectory using the fulcrum shaft 131 as the center of curvature.

On the top surface 101 of the unit frame 100 in the transporting unit 17, a guide shaft 132 is fixed at a position close to the fulcrum shaft 131 so as to vertically extend upward while a guide shaft 133 is fixed at a position separated from the fulcrum shaft 131 on the free end side so as to similarly vertically extend upward. As shown in FIGS. 9 and 10, the guide shaft 132 is upward inserted into the guide hole 15b from below while the guide shaft 133 also is upward inserted into the guide hole 15c from below. The end of the guide shaft 133 protrudes above the mechanism base 15, and on the mechanism base 15, a rotating ring 134 is rotatably inserted to the guide shaft 133.

On the mechanism base 15, a drive lever 135 is provided. The base of the drive lever 135 is rotatably supported on the mechanism base 15 via a shaft 136. The drive lever 135 is provided with a drive elongated hole 135a opened thereon, and the rotating ring 134 arranged around the guide shaft 133 is inserted into the drive elongated hole 135a.

The change-over member 91 arranged on the mechanism base 15 is provided with a unit control elongated hole 137 opened thereon. On the top surface of the drive lever 135, a transfer shaft 138 protrudes vertically, and the transfer shaft 138 is upward inserted into the unit control elongated hole 137 from below.

The unit control elongated hole 137 is provided with a non-active part 137a formed thereon. The non-active part 137a is formed along a circular trajectory, and the center of curvature of this circular trajectory agrees with that of the circular trajectory when the change-over member 91 slides in directions (d) and (e). Hence, when the transfer shaft 138 is positioned within the non-active part 137a as shown in FIG. 9, even when the change-over member 91 slides in the directions (d) and (e), its movement force is not applied to the transfer shaft 138. Also, the center of curvature of the non-active part 137a does not exist at the same position as that of the shaft 136, which is the rotational center of the drive lever 135. Therefore, when the transfer shaft 138 is positioned within the non-active part 137a and the change-over member 91 slides in the directions (d) and (e), the drive lever 135 is held in a clockwise rotated state as shown in FIG. 9 and the transporting unit 17 is maintained in a state stopped at the standby position.

In the unit control elongated hole 137, a drive inclination part 137b is provided continuously to Y1 side of the non-active part 137a, and furthermore, a holding part 137c is formed at the end on Y1 side of the drive inclination part 137b. The holding part 137c is located at a position closer to the center of curvature of the sliding trajectory of the change-over member 91 than the non-active part 137a.

Thus, while the change-over member 91 further slides in the direction (e) from the position of FIG. 9 to the position of FIG. 10, the transfer shaft 138 is transferred to the drive inclination part 137b, so that the transfer shaft 138 is counterclockwise moved and the drive lever 135 is counterclockwise rotated with the drive inclination part 137b. As a result, as shown in FIG. 10, the transporting unit 17 is counterclockwise rotated to the transfer operation position using the fulcrum shaft 131 as a fulcrum. At the transfer operation position shown in FIG. 10, the guide shaft 133 is positioned at the end on Y2 side of the guide hole 15c and the transfer shaft 138 is held in the holding part 137c of the unit control elongated hole 137, so that the transporting unit 17 is restricted at the transfer operation position.

According to the embodiment, the unit control elongated hole 137 provided in the change-over member 91 and the drive lever 135 constitute transfer-unit rotating means.

Then, the structure of the third power transfer unit 19 provided on the bottom surface 6 of the lower casing 3 will be described.

As shown in FIGS. 6 and 11, below the fulcrum shaft 131 fixed on the bottom surface 6, an integral gear 141 is rotatably supported. The integral gear 141 functions as a power transfer member rotating coaxially with the fulcrum shaft 131. The upper part of the integral gear 141 is a vertical worm gear 141a while the lower part is a lower gear 141b. As shown in FIG. 6, on the bottom surface 6 of the casing 2, an intermediate gear 142 is rotatably arranged so as to mate with the lower gear 141b. On the bottom surface 6, the third motor M3 is arranged and a worm gear 143 fixed to the rotating shaft is engaged with the intermediate gear 142.

As shown in FIG. 11, in the transporting unit 17, one end of the roller shaft 111 outward protrudes from the side face 103 on the fulcrum side of the unit frame 100, and a roller gear 144, which is a spur gear, is fixed to the end of the roller shaft 111 protruded from the side face 103. On the side face 103, a shaft 145 is fixed, to which an integral gear 146 is rotatably fixed. The integral gear 146 is made by integrating a small diameter spur gear 146a with a large diameter spur gear 146b, and the small diameter spur gear 146a is mated with the roller gear 144.

On the bottom surface 102 of the unit frame 100, a downward protruding support piece 102a is formed by being integrally folded, to which a shaft 148 is fixed. The shaft 148 extends in parallel with the roller shaft 111. To the shaft 148, the integral gear 147 is rotatably supported. The integral gear 147 is made by integrating a spur gear 147a with a worm wheel 147b. The spur gear 147a is mated with the large diameter spur gear 146b.

In a state that the bearing part 125 provided in the transporting unit 17 is rotatably inserted to the fulcrum shaft 131, a worm gear 141a is engaged with the worm wheel 147b. The rotating power of the third motor M3 is transmitted to the lower gear 141b and the worm gear 141a via the intermediate gear 142, and further transmitted to the worm wheel 147b from the worm gear 141a. This power is transmitted to the large diameter spur gear 146b of the integral gear 146 from the spur gear 147a, and further transmitted to the roller gear 144 from the small diameter spur gear 146a.

Since the rotating power of the third motor M3 provided on the side of the lower casing 3 is transmitted to the roller gear 144 via the integral gear 141 rotating coaxially with the fulcrum shaft 131, the roller shaft 111 can be driven independently from the rotating operation of the transporting unit 17 from the standby position to the transfer operation position using the fulcrum shaft 131 as a fulcrum. In the disk-storing disk device 1, the unit rotating means for rotating the transporting unit 17 from the standby position to the transfer operation position and the roller driving means for rotating the first and second transfer rollers 112 and 113 are separately provided so as to operate independently from each other.

Then, structures of the disk-storing region 20 and the holder selecting means 22 provided in the upper casing 5 will be described.

As shown in FIGS. 1, 2B, and 12, on the ceiling surface 11 of the upper casing 5, three selection shafts 151 downward extending in parallel with each other are rotatably supported. On the outer periphery of each of the selection shafts 151, a selection groove 152 is formed. As shown in FIG. 2B, the selection groove 152 is formed spirally. The upper part of the selection shaft 151 is a dense pitch part 152a and the lower part is also a dense pitch part 152b. In the dense pitch parts 152a and 152b, the selection groove 152 is formed at a small pitch. In the respective dense pitch parts 152a and 152b, at least five circuits (five pitches) of the selection groove 152 are formed. The intermediate part of the selection groove 152 is a thin pitch part 152c, in which one pitch of the selection groove 152 is formed between the dense pitch parts 152a and 152b.

The six holders 21 are provided by overlapping them in the vertical direction, and three insertion holes 21a are opened on the respective holders 21. The respective insertion holes 21a are inserted to the outer peripheries of the selection shafts 151, and the insertion hole 21a is provided with a convex retainer for being slidably retained to the selection groove 152. The respective retainers of the six holders 21 are arranged so as to be retained to the respective adjacent five pitches of the selection groove 152. Hence, when the selection shafts 151 are counterclockwise rotated, the holders 21 are downward fed one by one along the selection shafts 151 while when the selection shafts 151 are clockwise rotated, the holders 21 are upward fed one by one along the selection shafts 151. Then, any of the holders 21 retained to the thin pitch part 152c comes to the selection position (a) shown in FIG. 2B, so that an interval is spaced in the vertical direction between the holder 21 positioned at the selection position (a) and the holder 21 positioned at the dense pitch part 152b, into which the drive unit 14 can barge.

The three selection shafts 151 are rotated by being synchronized with each other. As a mechanism therefor, thin small diameter gears (not shown) are integrally fixed to the respective selection shafts 151. On the bottom surface of the ceiling surface 11 of the upper casing 5, a large-diameter ring gear is rotatably arranged, with which all the small diameter gears are engaged.

As shown in FIG. 2B, on the bottom surface of the ceiling surface 11 of the upper casing 5, a rotation shaft 99a is rotatably supported. At the lower end of the rotation shaft 99a, the transfer gear 99 is fixed so as to be able to engage with the change-over gear 98 in the second power transfer unit 16 shown in FIG. 9. At the upper end of the rotation shaft 99a, a thin gear 99b is fixed so as to engage with the ring gear. That is, the selection operation for moving any of the six holders 21 to the selection position (a) is performed by driving the second motor M2 provided in the second power transfer unit 16 so as to transmit the power to the transfer gear 99 via the change-over gear 98, and further by rotating the ring gear.

According to the embodiment, the three selection shafts 151 having the spiral selection groove 152 constitute the holder selecting means 22; alternatively, the holder selecting means 22 may be constructed by arranging a pin at the side edge of the holder 21 and by forming a plurality of cam grooves on plates slidably arranged inside the left side-face 9 and the rear surface 10 of the upper casing 5 so as to form a mechanism for moving up and down the pin of the holder 21 with the cam grooves.

As shown also in FIG. 13, the inner edge 21b of the holder 21 is notched in a concave curved shape, and when the drive unit 14 is rotated to the overlapping position, the inner edge 21b is located at a position not overlapping with the turntable 82. Also, as shown in FIG. 14, when the transporting unit 17 is rotated to the transfer operation position, the inner edge 21b is located at a position not overlapping with the transporting unit 17. As shown in FIG. 13, the drive unit 14 is clockwise rotated to the overlapping position using the support shaft 84 positioned on X2 side as well as at the end on Y2 side as a fulcrum; in order not to disturb its rotational operation, the three selection shafts 151 are arrange as follows. The two selection shafts 151 located at positions (j) and (k) are arranged at positions close to the rear surface 10 of the casing 2, and a phantom line Ob passing through the centers of the two selection shafts 151 is arranged about in parallel with the rear surface 10. The two selection shafts 151 located at positions (k) and (m) are arranged at positions close to the inner side of the left side-face 9.

Therefore, the normal line Oc extending to the position splitting the concave curved line of the inner edge 21b of the holder 21 into two lines is directed to the intermediate direction between the direction of Y1 and the direction of X2.

The holder 21 is made of a thin metallic plate, and on its bottom surface, holding claws 155 to 157 are provided as shown in FIGS. 12 and 13, so that the outer edges of the disks D supplied below the holders 21 are held between the holder 21 and the respective holding claws 155 to 157. The respective holding claws 155 to 157 are arranged close to the insertion holes 21a to be inserted to the selection shafts 151. The respective holding claws 155 to 157 are rotatably arranged using the outer periphery of the insertion hole 21a as a reference. On the rear surface 10 and inside the left side-face 9 of the casing 2, claw controlling means (not shown) are provided for rotating the respective holding claws 155 to 157 in accordance with the elevated position of the holder 21.

Then, the whole operation of the disk-storing disk device 1 will be described.

(Disk Insertion Standby Mode)

In the disk-storing disk device 1, the home position for waiting the insertion of the disk D is located at the overlapping or intervention position, at which the drive unit 14 is centered within or intervenes the disk-storing region 20, and the transporting unit 17 is located at the standby position along the internal side of the front surface 7 of the casing 2.

When specifying any of a plurality of holders 21 using an operation unit or a remote controller positioned in front of the front surface 7, as shown in FIG. 12, the drive unit 14 moves to the withdrawn position along the inside of the right side-face 8 of the casing 2. The home position for waiting the insertion of the disk D may also be established in the state shown in FIG. 12.

When the transporting unit 17 is in a mode shown in FIG. 12, the first and second transfer rollers 112 and 113 are slightly counterclockwise rotated from the parallel state with the front surface 7, and a retaining projection 161 arranged at the end on the free end side of the transporting unit 17 is fitted into a recess or a hole formed on the end face on the free end side of the drive unit 14. Hence, the drive unit 14 and the transporting unit 17, each being cantilevered, can be prevented from rattling. For example, when the disk-storing disk device 1 is under transportation and storage conditions, by retaining the drive unit 14 to the transporting unit 17 as mentioned above, the drive unit 14 and the transporting unit 17 can be prevented from coming into collision with other members due to vibration and impact so as to protect them.

When the disk-storing disk device 1 is mounted on an automobile and the home position, at which the disk is not operated, is established in the state of FIG. 12, each free end of the drive unit 14 and the transporting unit 17 can be prevented from rattling due to vibration of the automobile so as to suppress not only damage of the mechanisms but also rattling noise therefrom. The mode shown in FIG. 12 is established as follows.

With the first motor M1 arranged in the first power transfer unit 12, the rack member 32 is moved in the direction of Y2 as shown in FIG. 3 and the slider 31 and the change-over lever 38 are moved in the direction of Y2 together with the rack member 32. As shown in FIG. 6, with the change-over drive pin 41 provided in the change-over lever 38, the drive slider 85 arranged on the unit support base 13 is moved in the direction of Y2. With the drive recess 85a of the drive slider 85, the drive shaft 88 is moved in the direction of Y2 and the drive unit 14 is counterclockwise rotated, so that the drive unit 14 is established at the withdrawn position separated from the outer edges of the disks D held in the disk-storing region 20.

At this time, as shown in FIG. 3, the lock change-over member 42 is moved in the direction of (b) so as to stop, so that the transfer member 52 is clockwise rotated and the locking member 54 positioned inside the rear tab 3b is moved in the direction of X2. Similarly, the locking member 61 positioned inside the front tab 3a of the lower casing 3 is also moved in the direction of X2 as shown in FIG. 2B.

The restriction shaft 77 arranged in the rear of the unit support base 13 is retained within the restriction part 56a of the lock control hole 56 formed in the locking member 54 shown in FIG. 1 while the restriction shafts 78 and 78 arranged in front of the unit support base 13 are retained within the restriction parts 62a and 62a of the lock control holes 62 and 62 formed in the locking member 61 as shown in FIG. 2B. Since the restriction part 56a and the restriction parts 62a and 62a are positioned close to the bottom surface 6 of the casing 2, the unit support base 13 is restricted at a position close to the bottom surface 6, so that the dampers 71 to 73 are deformed with the unit support base 13 at this time so as to flatten out against the bottom surface 6.

In the mode shown in FIG. 12, the drive slider 85 is moved in the direction of Y2 so as to stop and the lock change-over member 42 is moved in the direction of (b) so as to stop, so that as shown in FIG. 8A, the abutment surface 63a of the intermediate restriction part 63 provided in the lock change-over member 42 abuts the abutment surface 87a of the movable restriction part 87 provided in the drive slider 85. Since the unit support base 13 is restricted in a state approaching the bottom surface 6 as described above, the abutment surface 87a of the movable restriction part 87 is slightly pressed on the abutment surface 63a of the intermediate restriction part 63.

As shown in FIG. 12, in the disk-storing disk device 1, the disk-storing region 20 having the holders 21 is arranged at a position approaching the rear surface 10 of the casing 2 for reducing the depth of the casing 2 while a region between the front surface 7 of the casing 2 and the disk-storing region 20 is established to be small for arranging only the transporting unit 17. For this end, the plane including a front portion 13A extending along the inner front surface 7 of the casing 2 and a right portion 13B positioned in the right region within the casing 2 is L-shaped. The depth widthwise size in the direction of Y1-Y2 of the front portion 13A is short.

On the unit support base 13, the locking member 54 and the locking member 61 are restrained with the two restriction shafts 78 and 78 provided in the front portion and the one restriction shaft 77 arranged at the rear end of the right portion 13B. A portion between the restriction shafts 78 and 78 and the restriction shaft 77 has a rigidity lower than that of other parts of the unit support base 13. Furthermore, since the drive unit 14 is mounted on the right portion 13B, the weight load of the unit support base 13 is always applied to between the restriction shafts 78 and 78 and the restriction shaft 77 from above.

However, as shown in FIGS. 6 and 12, when the drive unit 14 is located at the withdrawn position, the intermediate portion of the unit support base 13 is supported from below due to the abutment between the intermediate restriction part 63 and the movable restriction part 87 shown in FIG. 8A. Thus, the excessive stress can be prevented from being applied to the unit support base 13 having the drive unit 14 mounted thereon so as to prevent the unit support base 13 from being vertically deformed against the bottom surface 6.

In the mode shown in FIG. 12, in the second power transfer unit 16 shown in FIG. 9, the transfer shaft 138 provided in the drive lever 135 is positioned within the non-active part 137*a* of the unit control elongated hole 137 formed in the change-over member 91. Hence, the drive lever 135 is held in a clockwise rotated state and the guide shaft 133 is positioned at the end on Y1 side of the guide hole 15*c*, so that the transporting unit 17 is clockwise rotated so as to stop at the standby position separated from outer peripheries of the disks D in the disk-storing region 20.

(Holder Selecting Operation)

Upon selecting any of the six holders 21 arranged in the disk-storing region 20 by operating the operation unit or the remote controller positioned in front of the front surface 7, the holder selecting operation is started.

This holder selecting operation, as shown in FIG. 12, is performed by operating the second motor M2 shown in FIG. 9 in a state that the drive unit 14 is located at the withdrawn position and the transporting unit 17 is located at the standby position. Upon operating the second motor M2, the pinion gear 97 rotates so as to transmit the power to the rack teeth 91*b* and to slide the change-over member 91 in the direction (d) or in the direction (e). However, the operable range of the change-over member 91 is limited to the range in which the transfer shaft 138 provided in the drive lever 135 is positioned within the non-active part 137*a* of the unit control elongated hole 137. That is, the holder selecting operation is performed in a state that the drive lever 135 is maintained to be clockwise rotated and the transporting unit 17 is established not to move from the standby position.

To start the holder selecting operation, as shown in FIG. 9, the change-over gear 98 is established to engage both the output gear 94 and the transfer gear 99 by the selecting means (not shown). The power of the second motor M2 is transmitted to the transfer gear 99 shown in FIG. 2 via the change-over gear 98 from the output gear 94 so as to rotate the ring gear (not shown) provided on the ceiling surface 11 of the upper casing 5 so that the three selection shafts 151 provided in the holder selecting means 22 rotate in synchronous with each other.

When the selection shaft 151 is counterclockwise rotated, the holder 21 is fed downward one by one with the spiral selection groove 152, and when the selection shaft 151 is clockwise rotated, the holder 21 is fed upward one by one. When the holder 21 to be selected moves to the thin pitch part 152*c* of the selection groove 152 so as to come to the selection position (a) shown in FIG. 2B, the second motor M2 stops so as to stop the rotation of each selection shaft 151. At this time, the space between the holder 21 stopping at the selection position (a) and a holder 21 arranged adjacent below thereto is largely enlarged with the thin pitch part 152*c* of the selection groove 152.

The holder 21 to be selected is controllable whether it comes to the selection position (a) or not by detecting the rotating phase of the ring gear with the detecting means or by detecting the movement position of the change-over member 91 shown in FIG. 9 in the directions (d) and (e) with the detecting means. The detection output of the detecting means can be perceived by controlling means such as a CPU (not shown).

(Disk Conveying Operation)

When the selected holder 21 moves to the selection position (a) so as to stop, the controlling means offers the first motor M1 shown in FIGS. 2A and 2B a starting command so as to start the first motor M1. By the power of the first motor M1, the rack member 32 is moved from the position of FIG. 3 in the direction of Y1 so as to stop the first motor M1 at the time when the rack member 32 moves to the position of FIG. 4.

When the rack member 32 moves to the position of FIG. 4 from the position of FIG. 3, the slider 31 and the change-over lever 38 move together with the rack member 32 in the direction of Y1; with the change-over drive pin 41 provided in the change-over lever 38, the drive slider 85 is moved to the position of FIG. 7; the drive unit 14 is clockwise rotated with the drive slider 85; and the drive unit 14 intervenes to the intermediate position between the holder 21 located at the selection position (a) and the holder 21 positioned below there so as to be stopped. As shown in FIG. 13, the stopping position of the drive unit 14 at this time is a position where the rotation center of the turntable 82 agrees with that of the center of the disk D to be held by the holder 21.

Since the rack member 32 stops at the position of FIG. 4, at this time, the lock change-over member 42 stops in a state that the lock change-over member 42 moves in the direction (b), so that the locking member 54 and the locking member 61 maintain the state of moving in the direction of X2. Thus, the restriction shaft 77 provided in the rear of the unit support base 13 is maintained to be held within the restriction part 56*a* of the lock control hole 56 formed in the locking member 54 while the restriction shafts 78 and 78 provided in front of the unit support base 13 are also maintained to be retained with the restriction parts 62*a* and 62*a* of the lock control holes 62 and 62.

However, since the drive slider 85 moves in the direction of Y1, as shown in FIG. 8B, the movable restriction part 87 provided on the bottom surface of the drive slider 85 comes off the intermediate restriction part 63 provided in the lock change-over member 42.

When the disk D is inserted through the insertion opening 23 in the state of FIG. 13, the disk D enters the casing 2 so that the center Do of the disk D comes along the insertion center line Oa. The end extremity of the disk D on the insertion side enters between the intermediate part 114 of the transfer roller provided in the transporting unit 17 and the clamp part 106, so that the end extremity of the disk D is inserted into the casing 2 from the insertion opening 23 without resistance.

When the insertion of the disk D through the insertion opening 23 is detected with a detection member (not shown), the third motor M3 shown in FIG. 6 is started. The rotating power of the third motor M3 is transmitted to the intermediate gear 142 from the worm gear 143, and further transmitted to the lower gear 141*b* of the integral gear 141 shown in FIG. 11. Furthermore, the power is transmitted to the worm wheel 147*b* provided in the transporting unit 17 from the worm gear 141*a* arranged coaxially with the fulcrum shaft 131. This power is transmitted to the roller gear 144 via the spur gear 147*a* and the integral gear 146. The rotation direction of the roller gear 144 at this time is counterclockwise, so that the roller shaft 111 is rotated in the disk conveying direction.

When the both edge sides of the disk D inserted through the insertion opening 23 enter between the first transfer roller 112 and the clamp part 106 and between the second transfer roller 113 and the clamp part 106, the rotating power of the first and second transfer rollers 112 and 113 is transmitted to the disk D so as to convey the disk D to the casing 2 so that the center Do of the disk D comes along the insertion center line Oa. Upon detecting that the disk D is conveyed by a predetermined distance (about half of the disk radius, for example) by detecting means (not shown), the transporting unit 17 located at the standby position shown in FIG. 13 until that moment is started to rotate toward the transfer operation position shown in FIG. 14.

The operation to rotate the transporting unit 17 to the transfer operation position is performed by continuing the drive of the third motor M3 and the rotation of the first and second transfer rollers 112 and 113 in the conveying direction. At this time, as shown in FIG. 10, the change-over gear 98 is moved to a position canceling the engagement with the output gear 94 by the switching means so as not to transmit the power of the second motor M2 to the transfer gear 99.

Then, by the second motor M2, the change-over member 91 is slid in the direction (e) from the position of FIG. 9 to the position of FIG. 10. While the change-over member 91 is moving in the direction (e), with the drive inclination part 137b of the unit control elongated hole 137, the transfer shaft 138 is counterclockwise moved, so that the drive lever 135 is counterclockwise rotated. By the movement of the drive lever 135, the transporting unit 17 is counterclockwise rotated about the fulcrum shaft 131 to the transfer operation position shown in FIG. 14.

As shown in FIG. 14, when the transporting unit 17 is rotated toward the transfer operation position while the first and second transfer rollers 112 and 113 are rotating in the conveying direction, the outer edge of the disk D to be transferred into the casing 2 enters the guide groove 123 of the pressing guide member 121, so that the pressing guide member 121 is spread out to the extended position (h). By the rotating urging force of the pressing guide member 121, the disk D is always pressed on the first side (X1 side).

As shown in FIGS. 13 and 14, in the holder 21 located at the selection position (a) when the disk D is conveyed, the holding claw 155 positioned on the second side (X2 side) and the holding claw 156 located at an intermediate position are rotated to positions to clamp the disk D therebetween while the holding claw 157 positioned on the first side is clockwise rotated to evacuate to the position not clamping the disk D.

Since the disk holder 21 is positioned on the first side, and the transporting unit 17 itself rotates counterclockwise while conveying the disk D with the first and second transfer rollers 112 and 113, the center line of conveying the disk D is directed to the holder 21. Accordingly, the disk D is securely fed to the holder 21 positioned on the first side. The disk D is conveyed while being pressed on side X1 by the pressing guide member 121 and the holding claw 157 opposing the pressing direction is withdrawn as not to resist the disk D, so that the disk D can be fed to the position capable of securely holding the disk D with the holding claws 155 and 156. Therefore, the outer periphery of the disk D is clamped between the holder 21 and the holding claw 155 and between the holder 21 and the holding claw 156.

When the disk D is held by the holder 21 located at the selection position (a), the second motor M2 shown in FIG. 10 is operated in the reverse direction so as to slide the change-over member 91 in the direction (d). Thus, the drive lever 135 is clockwise rotated so as to start the transporting unit 17 rotating clockwise. At this time, the third motor M3 shown in FIG. 6 is continued to operate so as to continuously rotate the first and second transfer rollers 112 and 113.

Figure 15:
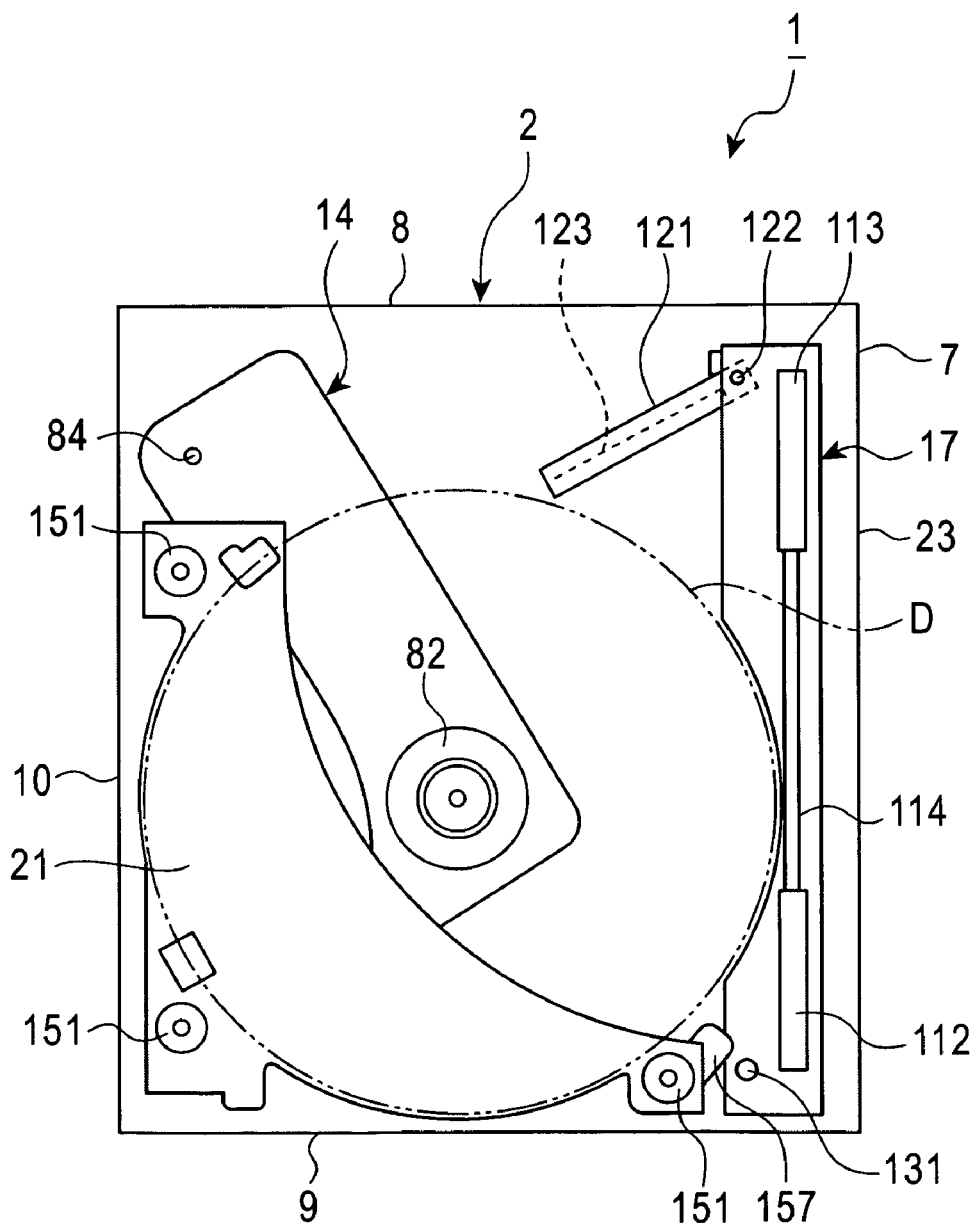
FIG. 15 is a plan view sequentially showing the entire operations of the disk-storing disk device and a disk driving mode.
Figure 15:
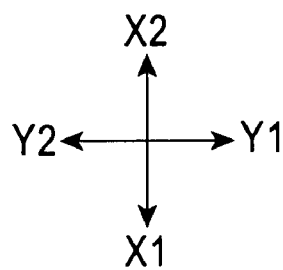

When the transporting unit 17 is clockwise rotated from the transfer operation position shown in FIG. 14, the disk D is maintained to be clamped with the first and second transfer rollers 112 and 113 and the clamp part 106; since the first and second transfer rollers 112 and 113 continue to rotate in the conveying direction, the transporting unit 17 can be returned to the standby position shown in FIG. 15 without applying a force carrying out the disk from the holder 21 to the disk D.

At this time, it is preferable that the peripheral speed of the first and second transfer rollers 112 and 113 be set to be slightly higher than the clockwise rotating speed of the transporting unit 17. By such setting, when the transporting unit 17 is clockwise rotated, the disk D is pressed to the holding claws 155 and 156 due to the speed difference, preventing the disk D from coming off the holder 21 located at the selection position (a).

Since the first and second transfer rollers 112 and 113 are spaced in the axial direction, when the transporting unit 17 is located at the transfer operation position as shown in FIG. 14, the contact length between the first and second transfer rollers 112 and 113 and the disk D is short. Hence, when the transporting unit 17 is clockwise rotated from the state shown in FIG. 14, the first and second transfer rollers 112 and 113 are directly separated from the disk D. Accordingly, the period when the disk D is pressed to the holding claws 155 and 156 with the first and second transfer rollers 112 and 113 due to the speed difference is short, suppressing excessive load applied to the holding claws 155 and 156 and damage of the disk D due to the rotation of the first and second transfer rollers 112 and 113.

(Disk Drive Operation)

After the transporting unit 17 was returned to the standby position shown in FIG. 15, when the disk D fed to the holder 21 located at the selection position (a) is continued to operate as it is, the following operation is performed.

To start driving the disk D, by the first motor M1 provided in the first power transfer unit 12, the rack member 32 is driven in the direction of Y1 from the position of FIG. 4 to the position of FIG. 5. At this time, while the slider 31 and the change-over lever 38 do not move in the direction of Y1 and the drive unit 14 is maintained to locate at the overlapping position shown in FIG. 15, by the movement of the rack member 32 in the direction of Y1, the connection rotation lever 44 is counterclockwise rotated and the lock change-over member 42 is slid in the direction (c). As a result, in the casing 2 on Y2 side, the transfer member 52 is counterclockwise rotated so as to slide the locking member 54 in the direction of X1 while in the front of the casing 2 shown in FIG. 2B, the locking member 61 is moved in the direction of X1.

During the moving in the direction of X1 of the locking member 54 shown in FIG. 1 and the locking member 61 shown in FIG. 2B, the restriction shaft 77 provided in the unit support base 13 is led to the raising part 56b of the lock control hole 56 formed in the locking member 54 while the restriction shafts 78 and 78 are simultaneously led to the raising parts 62b and 62b of the lock control holes 62 and 62 formed in the locking member 61. Thus, the unit support base 13 is raised and separated from the bottom surface 6 while the drive unit 14 supported on the unit support base 13 is also raised. Then, the turntable 82 provided in the drive unit 14 enters the center hole of the disk D held by the holder 21 located at the selection position (a) from below. The clamp mechanism (not shown) is operated at this time so as to clamp the center hole of the disk D to the turntable 82.

Furthermore, when the locking member 54 moves in the direction of X1 and the locking member 61 moves in the direction of X1, the restriction shaft 77 is led to the clearance hole 56*d* of the lock control hole 56 and the restriction shafts 78 and 78 are led to the clearance holes 62*d* and 62*d* of the lock control holes 62 and 62 so as to cancel the restriction between the locking members 54 and 61 and the restriction shafts 77, 78, and 78. Moreover, since the change-over lever 38 is further rotated clockwise as shown in FIG. 5, the change-over drive pin 41 moves to the clearance part 86*b* of the drive hole 86 formed in the drive slider 85 as shown in FIG. 7. Therefore, the unit support base 13 is to be elastically supported by the dampers 71 to 73 without receiving a restriction force.

Furthermore, as shown in FIG. 15, in the holder 21 located at the selection position (a), all the holding claws 155 to 157 are rotated in the withdrawn direction so as to separate from the disk D so that the holder 21 does not restrict the disk D. In the state that the unit support base 13 is elastically supported and the disk D is released from the holder 21 in such a manner, the turntable 82 is rotated so as to drive the disk D so that recorded information is reproduced or information is recorded by the optical head 83.

(Operation after Driving Disk)

When storing the disk in the disk-storing region 20 after finishing the driving by the drive unit 14, the first motor M1 in the first power transfer unit 12 is started so as to return the rack member 32 from the position of FIG. 5 to the position of FIG. 4. By moving the lock change-over member 42 in the direction (b), the locking member 54 and the locking member 61 are moved in the direction of X2. During this process, the restriction shaft 77 is held by the raising part 56*b* of the lock control hole 56 shown in FIG. 1 and the restriction shafts 78 and 78 are restricted by the raising parts 62*b* and 62*b* of the lock control holes 62 and 62 shown in FIG. 2B so as to raise the unit support base 13 and the drive unit 14.

Accordingly, the disk D clamped with the turntable 82 is pressed on the bottom surface of the holder 21 located at the selection position (a). At this time, all the holding claws 155 to 157 provided in the holder 21 are rotated so that the outer periphery of the disk D is retained by the holding claws 155 to 157 and the bottom surface of the holder 21. Then, the clamping between the turntable 82 and the disk D is cancelled so that the disk D is perfectly retained by the holder 21.

(Disk Discharge Operation)

In the disk-storing disk device 1, the disk D after finishing the driving by the drive unit 14 in the state shown in FIG. 15 can be discharged from the insertion opening 23 as it is. Alternatively, any of the holders 21 is selected and the disk D held in the selected holder 21 can be discharged. The operation selecting the holder 21 having the disk D to be discharged is the same as the holder selecting operation described above, in which as shown in FIG. 12, in a state that the drive unit 14 is moved to the withdrawn position and the transporting unit 17 is moved to the standby position, the holder 21 having the disk D to be discharged is moved to the selection position (a) by rotating the selection shaft 151.

The operation discharging the disk D held in the holder 21 is performed in a state that in the first power transfer unit 12, the rack member 32 is moved to the position of FIG. 4 and the drive unit 14 is moved to the overlapping position as shown in FIG. 15. In the disk discharging operation (and conveying operation), the turntable 82 of the drive unit 14 is positioned below the disk D so as to function as a guide member for preventing the disk from moving downward improperly.

In the disk discharging operation, as shown in FIG. 10, the change-over member 91 is moved in the direction (e) and the transporting unit 17 is moved from the standby position to the transfer operation position. At this time, the third motor M3 is started so as to rotate the first and second transfer rollers 112 and 113 in the carrying out direction while the transporting unit 17 is counterclockwise rotated. Thus, when the transporting unit 17 rotates to the transfer operation position, the end of the disk D on side Y1 held by the holder 21 can be smoothly clamped between the first and second transfer rollers 112 and 113 and the clamp part 106.

Thereafter, while the rotation of the first and second transfer rollers 112 and 113 in the carrying out direction is continued, the transporting unit 17 is moved from the transfer operation position shown in FIG. 14 to the standby position shown in FIGS. 13 and 15. Thus, the disk D is discharged outside through the insertion opening 23 by the transferring force of the first and second transfer rollers 112 and 113 and the clockwise rotation power of the transporting unit 17.

In addition, as shown in FIG. 15, when the disk D after finishing the driving by the drive unit 14 is discharged, in a state that the disk D is clamped to the turntable 82, the transporting unit 17 is rotated from the standby position to the transfer operation position as described above, so that the disk D is clamped between the first and second transfer rollers 112 and 113 and the clamp part 106. Directly after the disk D was clamped, the disk clamping by the turntable 82 is released, and the disk D is discharged from the insertion opening 23 by rotating the transporting unit 17 to the standby position.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A disk-storing disk device comprising:
   a casing having an insertion opening formed on the front face of the casing;
   a drive unit having a rotation drive unit arranged within the casing operable to rotate a disk;
   a transporting unit arranged within the casing having a transfer roller and a clamp member operable to clamp the disk therebetween;
   a plurality of disk holders arranged within the casing so as to overlap with each other in one direction; and
   a disk holder selector arranged within the casing operable to move at least one of the plurality of disk holders to a selected position as well as operable to increase the size of a space between a first disk holder located at the selected position and a second disk holder adjacent thereto,
   wherein when a phantom line dividing the insertion opening into two in the opening width direction and extending in a direction perpendicular to the front face of the casing is defined as an insertion center line, the center of the disk when held by the first disk holder is separated from the insertion center line on a first side while the drive unit is separated from the insertion center line on a second side, which is opposite of the first side, and the drive unit is rotatably supported about a first fulcrum positioned near the back side of the casing while the transporting unit is positioned inside the front face of the casing and rotatably supported about a second fulcrum positioned on the first side and separated from the insertion center line, the disk-storing disk device further comprising:
- a rotating unit operable to rotate the drive unit from a withdrawn position, in which the rotation drive unit is positioned along a side of the casing as well as separated from the outer periphery of the disk when held by the first disk holder, to an overlapping position, in which the rotation drive unit overlaps with the disk; and
- a transporting-unit rotating unit operable to rotate the transporting unit from a standby position, in which the shaft of the transfer roller is parallel with the front face of the casing as well as separated from the outer periphery of the disk, to a transfer operation position, in which the transfer roller overlaps with the disk, wherein when a disk inserted through the insertion opening is clamped between the transfer roller and the clamp member, the transporting unit is rotated to the transfer operation position so as to convey the disk toward the first disk holder located at the selected position.

2. The device according to claim 1, wherein the rotating region of the drive unit is operable to overlap with that of the transporting unit, and when the drive unit is located at the overlapping position, the transporting unit is operable to rotate from the standby position to the transfer operation position.

3. The device according to claim 1, wherein when the first disk holder is moved to the selected position by the disk holder selector, the transporting unit is returned to the standby position and the drive unit is rotated from the overlapping position to the withdrawn position.

4. The device according to claim 1, wherein when the transporting unit is rotated from the standby position toward the transfer operation position, the transfer roller is operable to rotate in a rotational direction conveying the disk toward the first disk holder, and after conveying the disk to a position capable of holding the disk with the first disk holder, the transporting unit is returned to the standby position from the transfer operation position while the transfer roller is rotated in the conveying rotation direction.

5. The device according to claim 4, wherein when the transporting unit is returned to the standby position from the transfer operation position, the revolution speed of the transfer roller is established so as to pressurize the disk to the first disk holder.

6. The device according to claim 4, wherein when the disk held with the first disk holder is moved toward the insertion opening, or when the disk is released from the clamping in the rotation drive unit is moved toward the insertion opening, the transporting unit is returned to the standby position from the transfer operation position while the transfer roller is rotated in a rotational direction which is the reverse of the conveying rotation direction.

7. The device according to claim 4, further comprising a roller driving unit operable to rotate the transfer roller, the roller driving unit is arranged differently from the transporting-unit rotating unit.

8. The device according to claim 1, wherein an intermediate portion of the transfer roller in the axial direction is reduced in size such that the intermediate portion is smaller in diameter than end portions of the transfer roller, and when the transporting unit is moved to the transfer operation position, the intermediate portion does not clamp the disk.

9. The device according to claim 1, wherein between a free-end portion of the drive unit located at the withdrawn position, which is opposite to the first fulcrum, and a free-end portion of the transporting unit located at the standby position, which is opposite to the second fulcrum, a retainer is operable to couple the drive unit and the transporting unit together.

10. The device according to claim 1, wherein the inner edge of at least one of the plurality of disk holders is configured so as not to overlap with the rotation drive unit when the drive unit is rotated to the overlapping position.

11. The device according to claim 1, wherein the inner edge of at least one of the plurality of disk holders is configured so as not to overlap with the transporting unit when the transporting unit is rotated to the transfer operation position.

12. A disk-storing disk device comprising:
- a casing having an insertion opening formed on the front face of the casing;
- a drive unit having a rotation drive unit arranged within the casing operable to rotate a disk;
- a transporting unit arranged within the casing having a transfer roller and a clamp member operable to clamp a disk therebetween;
- a plurality of disk holders arranged within the casing so as to overlap with each other in one direction; and
- a disk holder selector arranged within the casing operable to move any of the plurality of disk holders to a selected position as well as for increasing a space between a first disk holder located at the selected position and a second disk holder adjacent thereto, wherein when a phantom line dividing the insertion opening into two in the opening width direction and extending in a direction perpendicular to the front face of the casing is defined as an insertion center line, the center of the disk when held by the first disk holder is separated from the insertion center line on a first side while the drive unit is separated from the insertion center line on a second side, which is opposite of the first side, and the drive unit is rotatably supported about a first fulcrum positioned near the back side of the casing while the transporting unit is positioned inside the front face of the casing and rotatably supported about a second fulcrum positioned on the first side and separated from the insertion center line, the disk-storing disk device further comprising:
- a rotating unit operable to rotate the drive unit from a withdrawn position, in which the rotation drive unit is positioned near the front side of the casing as well as separated from the outer periphery of the disk when held by the first disk holder, to an overlapping position, in which the rotation drive unit overlaps with the disk when held by the first disk holder; and
- a transporting-unit rotating unit operable to rotate the transporting unit from a standby position, in which the shaft of the transfer roller is parallel with the front face of the casing as well as separated from the outer periphery of the disk when held by one of the plurality of disk holders, to a transfer operation position, in which the transfer roller overlaps with the disk when held by one of the plurality of disk holders, wherein the rotating region of the drive unit overlaps with that of the transporting unit, and only when the drive unit is located at the overlapping position, the transporting unit is operable to rotate from the standby position to the transfer operation position, and when a disk inserted through the insertion opening is clamped between the transfer roller and the clamp member, the transfer roller is rotated and simultaneously the transporting unit is rotated to the transfer operation position so as to convey the disk toward the first disk holder located at the selected position.

13. The device according to claim 12, wherein when the first disk holder is moved to the selected position by the disk holder selector, the transporting unit is returned to the standby position and the drive unit is rotated from the overlapping position to the withdrawn position.

14. The device according to claim 12, wherein when the transporting unit is rotated from the standby position toward the transfer operation position, the transfer roller is rotated in a rotational direction conveying the disk toward the holder, and after conveying the disk to a position in which one of the plurality of disk holders is capable of holding the disk, the transporting unit is returned to the standby position from the transfer operation position while the transfer roller is rotated in the conveying rotation direction.

15. The device according to claim 14, wherein when the transporting unit is returned to the standby position from the transfer operation position, the revolution speed of the transfer roller is established so as to pressurize the disk to the first disk holder.

16. The device according to claim 14, wherein when the disk held by the first disk holder is moved toward the insertion opening, or when the disk is released from the clamping in the rotation drive unit and moved toward the insertion opening, the transporting unit is returned to the standby position from the transfer operation position while the transfer roller is rotated in an outward rotational direction which is the reverse of the conveying rotation direction.

17. The device according to claim 14, further comprising a roller driving unit operable to rotate the transfer roller, the roller driving unit is arranged differently from the transporting-unit rotating unit.

18. The device according to claim 12, wherein an intermediate portion of the transfer roller in the axial direction is reduced in size such that the intermediate portion is smaller in diameter than both end portions of the transfer roller, and when the transporting unit is moved to the transfer operation position, the intermediate portion does not clamp the disk.

19. The device according to claim 12, wherein between a free-end portion of the drive unit located at the withdrawn position, which is opposite the first fulcrum, and a free-end portion of the transporting unit located at the standby position, which is opposite the second fulcrum, a retainer is operable to couple the drive unit and the transporting unit together.

20. The device according to claim 12, wherein the inner edge of at least one of the plurality of disk holders is reduced in size so as to not overlap with the rotation drive unit when the drive unit is rotated to the overlapping position.

21. The device according to claim 12, wherein the inner edge of at least one of the plurality of disk holders is reduced in size so as to not overlap with the transporting unit when the transporting unit is rotated to the transfer operation position.

22. A disk-storing disk device comprising:
a casing having an insertion opening formed on the front face of the casing;
a drive unit having a rotation drive unit arranged within the casing operable to rotate a disk;
a transporting unit arranged within the casing having a transfer roller and a clamp member operable to clamp a disk therebetween; and
a disk holder arranged within the casing operable to hold the disk, wherein when a phantom line dividing the insertion opening into two in the opening width direction and extending in a direction perpendicular to the front face of the casing is defined as an insertion center line, the center of the disk when held by the disk holder is separated from the insertion center line on a first side while the drive unit is separated from the insertion center line on a second side, which is opposite of the first side, and the drive unit is rotatably supported about a first fulcrum positioned near the back side of the casing while the transporting unit is positioned inside the front face of the casing and rotatably supported about a second fulcrum positioned on the first side and separated from the insertion center line, the disk-storing disk device further comprising:
a rotating unit operable to rotate the drive unit from a withdrawn position, in which the rotation drive unit is positioned on one side of the casing as well as separated from the outer periphery of the disk when held by the disk holder, to an overlapping position, in which the rotation drive unit overlaps with the disk when held by the disk holder; and
a transporting-unit rotating unit operable to rotate the transporting unit from a standby position, in which the shaft of the transfer roller is parallel with the front face of the casing as well as separated from the outer periphery of the disk when held by the disk holder, to a transfer operation position, in which the transfer roller overlaps with the disk when held by the disk holder,
wherein the rotating region of the drive unit overlaps with that of the transporting unit, and when a disk inserted through the insertion opening is clamped between the transfer roller and the clamp member, the transfer roller is rotated and simultaneously the transporting unit is rotated to the transfer operation position so as to convey the disk toward the disk holder.

* * * * *

UNITED STATES PATENT AND TRADEMARK OFFICE
CERTIFICATE OF CORRECTION

PATENT NO. : 7,472,403 B2
APPLICATION NO. : 11/385258
DATED : December 30, 2008
INVENTOR(S) : Tsutomu Tatekawa et al.

It is certified that error appears in the above-identified patent and that said Letters Patent is hereby corrected as shown below:

On the Title Page

In column 2, line 3, Item [56] under "FOREIGN PATENT DOCUMENTS", delete "2003-101745" and substitute --2001-101745-- in its place.

Signed and Sealed this

Thirtieth Day of June, 2009

JOHN DOLL
*Acting Director of the United States Patent and Trademark Office*